United States Patent
Dai

(10) Patent No.: US 11,482,944 B2
(45) Date of Patent: Oct. 25, 2022

(54) AC TO DC CONVERTER WITH PARALLEL CONVERTER

(71) Applicant: Huawei Digital Power Technologies Co., Ltd., Shenzhen (CN)

(72) Inventor: Heping Dai, Plano, TX (US)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/007,731

(22) Filed: Jun. 13, 2018

(65) Prior Publication Data

US 2019/0252995 A1 Aug. 15, 2019

Related U.S. Application Data

(60) Provisional application No. 62/631,217, filed on Feb. 15, 2018.

(51) Int. Cl.
*H02M 7/06* (2006.01)
*H02M 3/158* (2006.01)
(Continued)

(52) U.S. Cl.
CPC .............. *H02M 7/06* (2013.01); *H02M 1/007* (2021.05); *H02M 3/158* (2013.01); *H02M 3/33507* (2013.01)

(58) Field of Classification Search
CPC .......... H02M 3/335; H02M 2001/007; H02M 2001/0096; H02M 7/02; H02M 7/04;
(Continued)

(56) References Cited

U.S. PATENT DOCUMENTS 5,119,283 A * 6/1992 Steigerwald ............ H02M 1/10
363/37
5,786,992 A * 7/1998 Vinciarelli .............. H02J 1/102
363/131
(Continued)

FOREIGN PATENT DOCUMENTS

CN 1845430 A 10/2006
CN 103401466 A 11/2013
(Continued)

OTHER PUBLICATIONS

International Search Report dated May 13, 2019, in PCT Patent Application No. PCT/CN20191075163, 9 pages.
(Continued)

*Primary Examiner* — Gary L Laxton
(74) *Attorney, Agent, or Firm* — Vierra Magen Marcus LLP

(57) ABSTRACT

An apparatus having an AC rectifier configured to generate one or more rectified signals from an alternating current (AC) signal, bus having a positive line and a negative line, parallel converter connected between the positive line and the negative line, and bulk capacitor coupled to the parallel converter. The bus is connected to the AC rectifier to receive a first of the rectified signals between the positive line and the negative line. The apparatus has a controller configured to operate the parallel converter in a first mode in which energy from a second of the rectified signals from the AC rectifier is stored in the bulk capacitor and a second mode in which the energy stored in the bulk capacitor is discharged to the bus to increase a voltage on the bus during at least an initial portion of the second mode.

12 Claims, 18 Drawing Sheets

(51) Int. Cl.
*H02M 1/00* (2006.01)
*H02M 3/335* (2006.01)

(58) Field of Classification Search
CPC ...... H02M 7/21; H02M 7/217; H02M 7/2173; H02M 7/2176; H02M 3/158; H02M 3/33507; H02M 7/06
See application file for complete search history.

(56) References Cited

U.S. PATENT DOCUMENTS

| | | | | |
|---|---|---|---|---|
| 7,616,465 | B1* | 11/2009 | Vinciarelli | H02M 3/157 323/265 |
| 9,887,658 | B2* | 2/2018 | Yamashita | H02M 7/48 |
| 10,097,109 | B1* | 10/2018 | Ye | H02M 1/10 |
| 2001/0042739 | A1* | 11/2001 | Mela | B23K 9/1043 219/130.1 |
| 2008/0094861 | A1* | 4/2008 | Wang | H02M 3/1588 363/21.11 |
| 2010/0156180 | A1* | 6/2010 | Nishiyama | H02J 7/345 307/46 |
| 2012/0120692 | A1* | 5/2012 | Choi | H02M 3/335 363/78 |
| 2013/0264868 | A1* | 10/2013 | Higaki | H02J 7/345 307/10.1 |
| 2016/0181931 | A1 | 6/2016 | Song et al. | |
| 2017/0201202 | A1 | 7/2017 | Yamashita et al. | |

FOREIGN PATENT DOCUMENTS

| | | |
|---|---|---|
| CN | 103607107 A | 2/2014 |
| CN | 105763078 A | 7/2016 |
| CN | 106471725 A | 3/2017 |
| JP | H07245956 A | 9/1995 |

OTHER PUBLICATIONS

Yoshiya Ohnuma et al.,"A Control Method for a Single-to-three-phase Power Converter with an Active Buffer and a Charge Circuit",Energy Conversion Congress and Exposition,2010 IEEE,Sep. 12, 2010,total 7 pages.

Hojoon Shin et al.,"Active DC-Link Circuit for Single-Phase Diode Rectifier System with Small Capacitance",2014 International Power Electronics and Application Conference and Exposition,IEEE,Nov. 5, 2014,total 6 pages.

Extended European Search Report dated Mar. 10, 2021, European Patent Application No. 19754124.6.

Office Action dated May 6, 2021, Chinese Patent Application No. 201980013809.9.

* cited by examiner

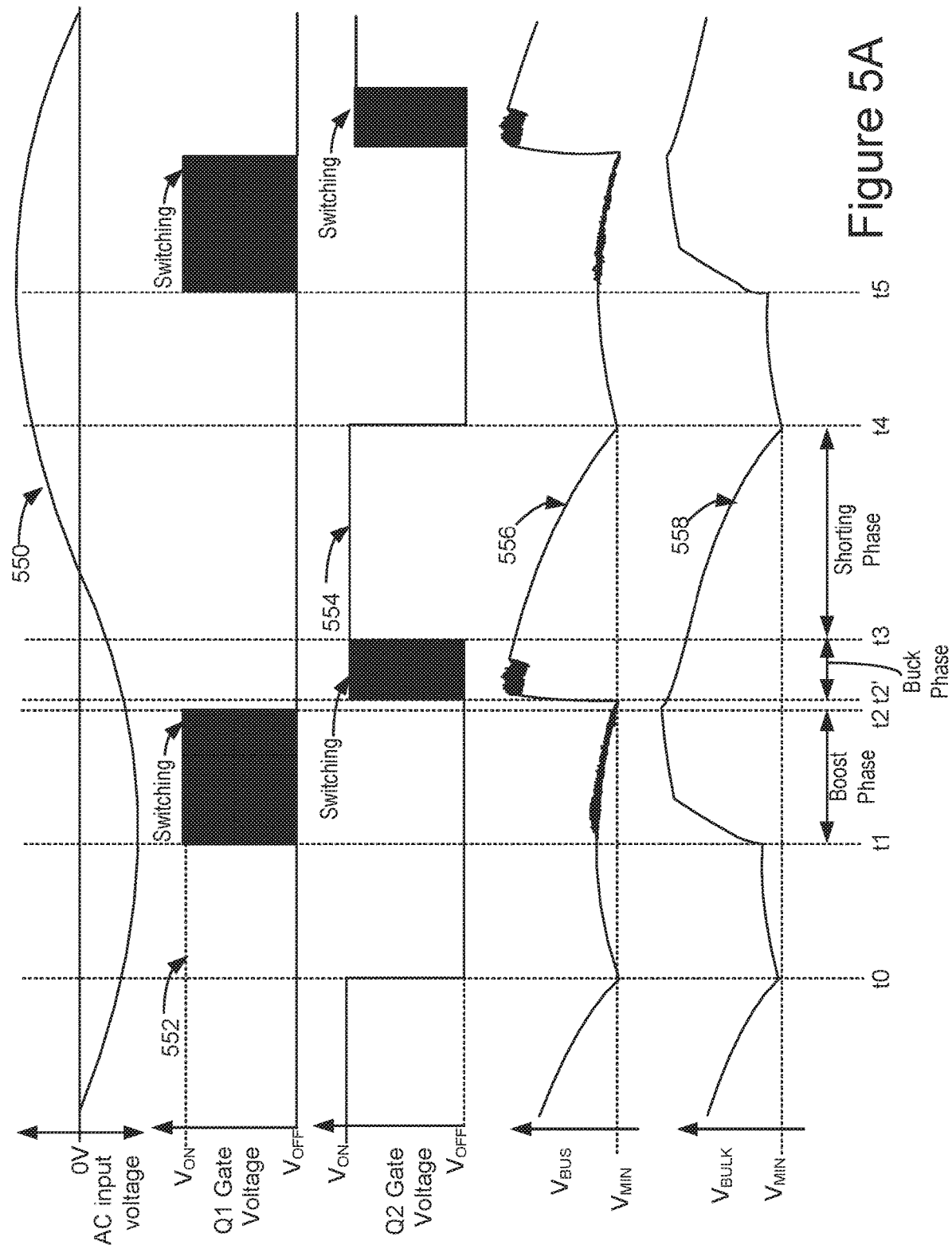

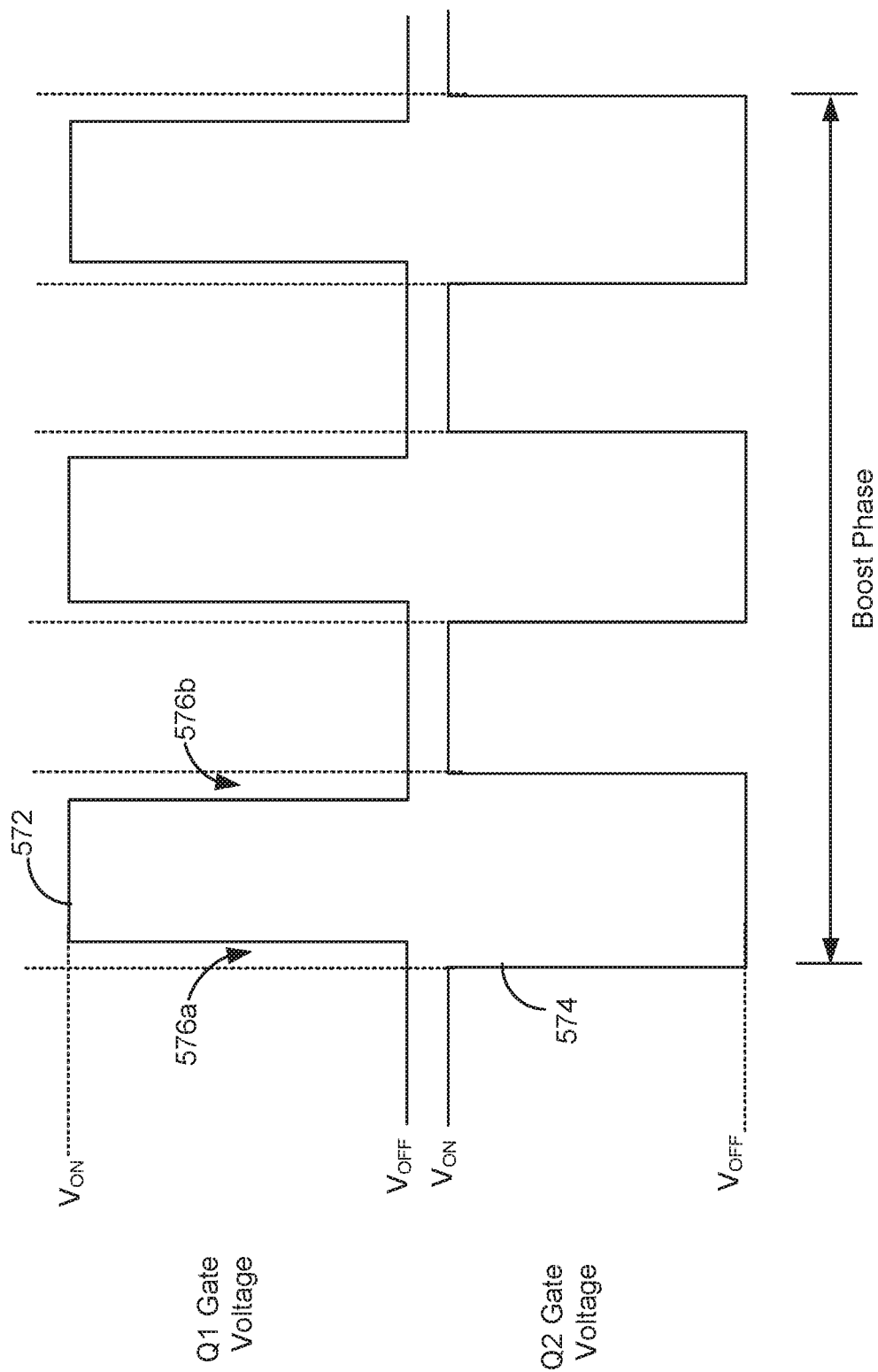

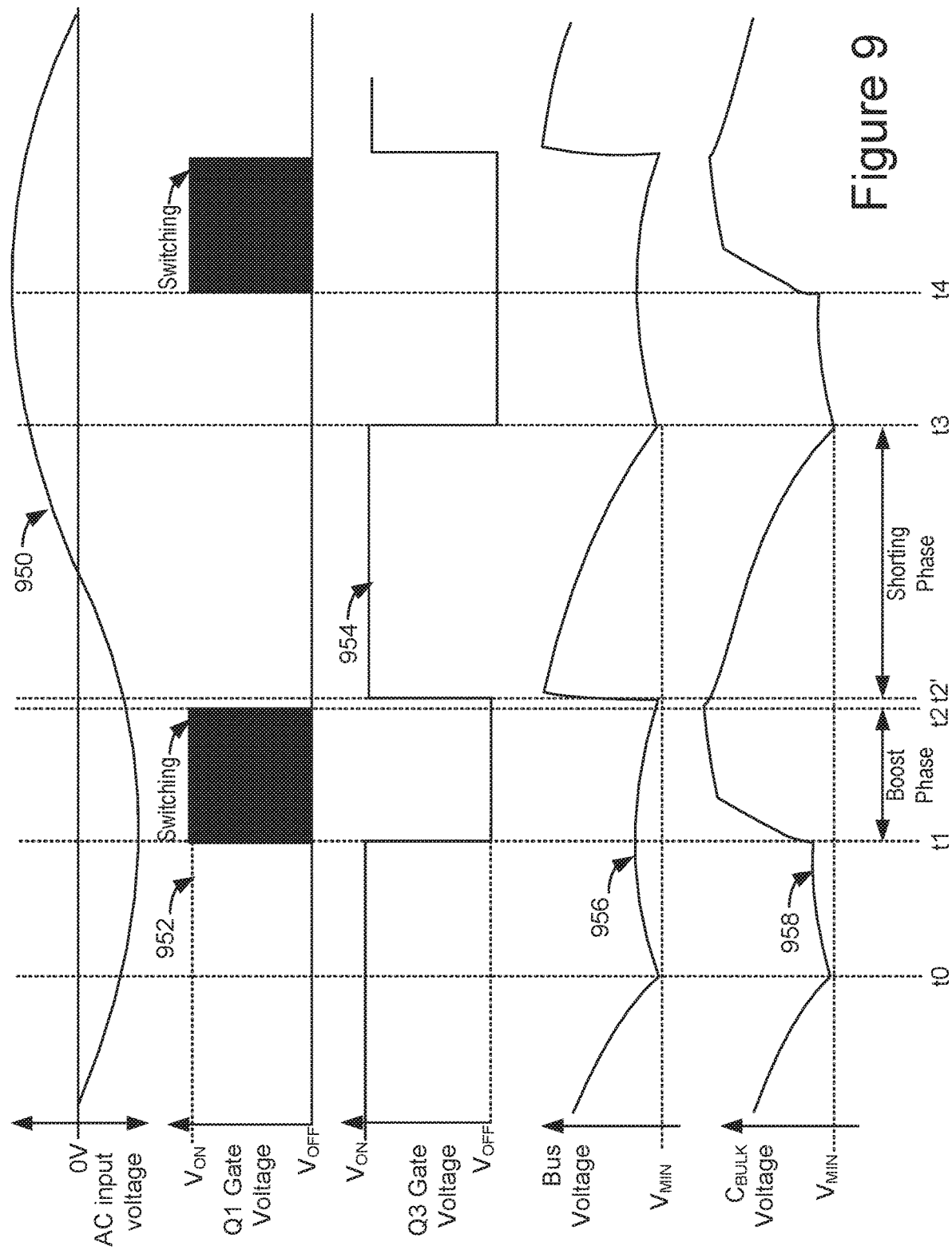

AC TO DC CONVERTER WITH PARALLEL CONVERTER

CLAIM FOR PRIORITY

This application claims the benefit of U.S. Provisional Appl. No. 62/631,217, entitled, "AC to DC Converter with Parallel Converter," filed Feb. 15, 2018, which is herein incorporated by reference in its entirety.

FIELD

The following is related generally to the field of alternating current (AC) to direct current (DC) converters.

BACKGROUND

AC to DC converters are a type of electric power converter. An AC to DC converter may also be referred to as an AC to DC adaptor. While having many purposes, one use of an AC to DC converter is to charge electronic devices such as cellular telephones, notepad computers, laptop computers, etc. For example, a user may plug the AC to DC converter into an AC electrical power outlet (e.g., wall socket) to charge a battery in a portable electronic device. Another use of an AC to DC converter is provide electrical power for electronic devices that do not have internal circuitry to derive the required DC power from an AC power source.

BRIEF SUMMARY

According to one aspect of the present disclosure, there is provided an apparatus that comprises an AC rectifier configured to generate one or more rectified signals from an alternating current (AC) signal; and a bus having a positive line and a negative line. The bus is connected to the AC rectifier to receive a first of the one or more rectified signals between the positive line and the negative line. The apparatus also comprises a parallel converter connected between the positive line and the negative line of the bus. The parallel converter is connected to the AC rectifier in order to receive a second of the one or more rectified signals. The apparatus also comprises a bulk capacitor coupled to the parallel converter. The apparatus also comprises a controller configured to operate the parallel converter in a first mode in which energy from the second of the one or more rectified signals is stored in the bulk capacitor and a second mode in which the energy stored in the bulk capacitor is discharged to the bus to increase a voltage on the bus during at least an initial portion of the second mode.

Optionally, in the preceding aspect, the controller is further configured to operate the parallel converter in the first mode to increase the voltage on the bulk capacitor to a greater magnitude than a magnitude of the voltage on the bus.

Optionally, in any of the preceding aspects, the controller is further configured to stop charging the bulk capacitor in the first mode at or prior to the voltage on the bus dropping to a minimum specified voltage.

Optionally, in any of the preceding aspects, during the initial portion of the second mode the voltage on the bus is increased to a voltage having about the same magnitude as the magnitude of the voltage on the bulk capacitor.

Optionally, in any of the preceding aspects, the parallel converter is configured to operate in a boost mode during the first mode to store energy in the bulk capacitor using the first of the one or more rectified signals from the AC rectifier.

Optionally, in any of the preceding aspects, the parallel converter is configured to operate in a buck mode during an initial portion of the second mode to increase the voltage on the bus using the energy stored in the bulk capacitor.

Optionally, in any of the preceding aspects, the parallel converter is configured to operate in a shorting mode during an initial portion of the second mode to increase the voltage on the bus using the energy stored in the bulk capacitor.

Optionally, in any of the preceding aspects, the controller is further configured to: switch a transistor in the parallel converter during a first phase of the second mode to increase the voltage on the bus using the energy stored in the bulk capacitor; and short the bulk capacitor to the bus during a second phase of the second mode to maintain the voltage on the bus at or above a minimum specified bus voltage without switching the transistor.

Optionally, in any of the preceding aspects, the first of the one or more rectified signals and the second of the one or more rectified signals are the same rectified signal.

Optionally, in any of the preceding aspects, the apparatus further comprises further comprising a voltage converter coupled between the bus and a DC output of the apparatus, wherein the voltage converter is configured to convert the voltage from the bus and provide the converted voltage to the DC output.

According to another aspect of the present disclosure, there is provided a method of operating an alternating current (AC) to direct current (DC) converter. The method comprises receiving an AC signal at an input of an AC rectifier in the AC to DC converter, rectifying the AC signal by the AC rectifier to produce one or more rectified signals, and providing a first of the one or more rectified signals to a bus having a positive line and a negative line. The method also comprises controlling a parallel converter connected between the positive line and the negative line of the bus in order to: use a second of the one or more rectified signals during a first mode to store energy into a bulk capacitor coupled to the parallel converter; and discharge the energy stored in the bulk capacitor to the bus to increase a voltage on the bus during at least an initial portion of a second mode.

Optionally, in any of the preceding aspects, controlling the parallel converter in the first mode further comprises operating the parallel converter to increase a voltage on the bulk capacitor to a greater magnitude than a magnitude of the voltage on the bus.

Optionally, in any of the preceding aspects, controlling the parallel converter in the first mode further comprises stopping transferring charge from the bus to the bulk capacitor at or prior to the voltage on the bus dropping to a minimum specified voltage.

Optionally, in any of the preceding aspects controlling the parallel converter in the second mode further comprises: operating the parallel converter in a buck mode during a first phase of the second mode to increase the voltage on the bus using energy stored in the bulk capacitor during the first mode; and shorting the bulk capacitor to the bus during a second phase of the second mode to maintain the voltage on the bus at or above a minimum specified bus voltage without operating the parallel converter in the buck mode.

According to an additional aspect of the present disclosure, there is provided an alternating current (AC) to direct current (DC) converter comprising: a bus having a positive line and a negative line; an AC rectifier having an input and one or more outputs. A first of the one or more outputs is connected between the positive line and the negative line of the bus. The AC rectifier is configured to rectify an AC voltage received at the input and to provide a first rectified voltage to the first of the one or more outputs and a second rectified voltage to a second of the one or more outputs. The AC to DC converter further includes a parallel converter connected to the second output of the AC rectifier. The parallel converter has a first terminal connected to the positive line, a second terminal connected to the negative line, and a third terminal. The AC to DC converter further includes a bulk capacitor coupled between the third terminal of the parallel converter and the negative line. The AC to DC converter further includes a controller configured to operate the parallel converter in: i) a first mode in which the parallel converter uses the second rectified voltage from the AC rectifier to store energy in the bulk capacitor; and ii) a second mode in which the energy stored in the bulk capacitor is discharged to the bus. During at least an initial portion of the second mode the energy stored in the bulk capacitor is used to increase a voltage on the bus. The AC to DC converter further includes a DC to DC converter coupled in series between the bus and a DC output of the AC to DC converter. The DC to DC converter is configured to convert a voltage from the bus to a DC output voltage at the DC output.

Optionally, in the preceding aspect, the controller is further configured to: operate the parallel converter in the first mode to increase the voltage on the bulk capacitor to a greater magnitude than a magnitude of the voltage on the bus; and stop storing energy in the bulk capacitor in the first mode at or prior to the voltage on the bus dropping to a minimum specified voltage.

Optionally, in any of the preceding aspects, the parallel converter comprises: an inductor having a first terminal connected to the second output of the AC rectifier and a second terminal; a first switch connected between the second terminal of the inductor and the negative line of the bus; and a second switch connected between the second terminal of the inductor and a first terminal of the bulk capacitor. A second terminal of the bulk capacitor is connected to the negative line of the bus. The controller is configured to control the first switch in the first mode to store the energy in the bulk capacitor and to control the second switch during the second mode to use the energy stored in the bulk capacitor to increase the voltage on the bus.

Optionally, in any of the preceding aspects, the parallel converter further comprises: a third switch coupled between the first terminal of the bulk capacitor and the positive line of the bus. The controller is configured to control the third switch to short the bulk capacitor to the bus during the second mode.

Optionally, in any of the preceding aspects, the parallel converter further comprises an inductor coupled between the third switch and the bus.

Optionally, in any of the preceding aspects, the parallel converter further comprises a thermistor coupled between the third switch and the bus.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIG. 5A is a timing diagram of one embodiment of voltages during operation of AC to DC converter in FIG. 4.

FIG. 5B is a timing diagram of another embodiment of voltages during operation of AC to DC converter in FIG. 4.

FIG. 5C depicts an alternative switching during one embodiment of a boost phase.

FIG. 9 depicts one embodiment of voltages during operation of various embodiments of AC to DC converters.

DETAILED DESCRIPTION

The present disclosure will now be described with reference to the figures, which in general relate to an AC to DC converter having a parallel converter, as well as methods of operating the AC to DC converter. The AC to DC converter has a bulk capacitor, which helps to maintain a bus voltage above a specified voltage level. The parallel converter may be used to charge and discharge the bulk capacitor, which allows the capacitance of the bulk capacitor to be greatly reduced. Reducing the capacitance allows the size of the bulk capacitor to be greatly reduced. For example, rather than using a large electrolytic capacitor to maintain a bus voltage above the specified voltage level, the AC to DC converter may contain a much smaller ceramic capacitor. This provides for a considerable size reduction of the AC to DC converter.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1:
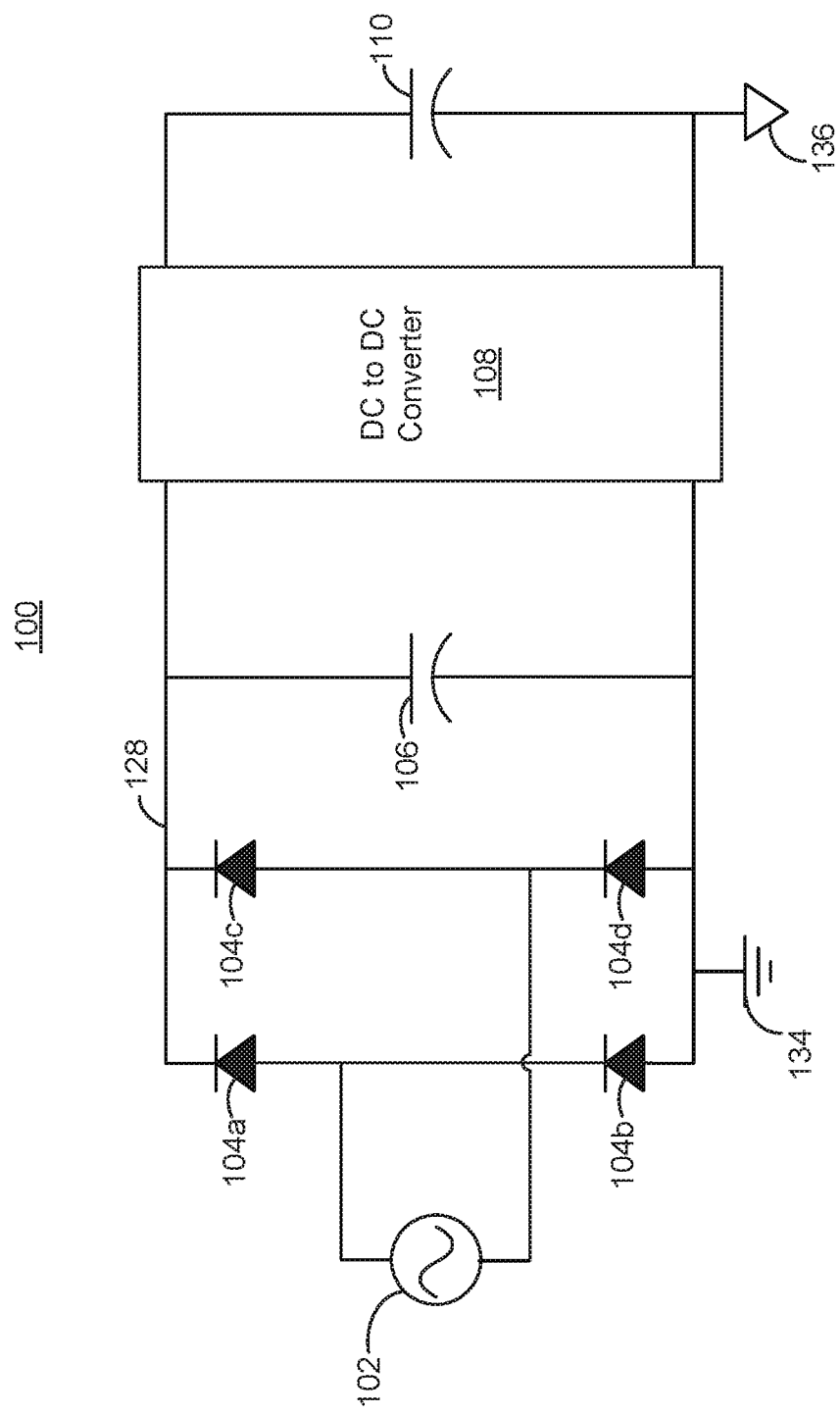
FIG. 1 depicts an AC to DC converter.

FIG. 1 depicts an AC to DC converter. In general, the AC to DC converter 100 has a diode bridge that comprises diodes 104a, 104b, 104c, 104d, bridge capacitor 106, DC to DC converter 108, and load capacitor 110. Two grounds 134, 136 are depicted, one on each side of the DC to DC converter 108. Note that the DC to DC converter 108 may provide electrical isolation between its input and output, and that ground 134 is not necessarily electrically connected to ground 136. Note that load capacitor 110 is not necessarily a part of the AC to DC converter 100, but may represent a load connected to the AC to DC converter 100. The AC to DC converter 100 is connected to an AC power source 102. As is well known, an AC power source 102 provides an AC signal that has an AC voltage and an AC current. The AC power source 102 may also be referred to herein as an AC voltage source.

The diode bridge is connected between electrical line 128 and ground 134. The diode bridge serves as a rectifier stage that rectifies the AC signal from AC power source 102. The diode bridge may rectify both an AC voltage and an AC current. The bridge capacitor 106 is also connected between electrical line 128 and ground 134. The voltage across the bridge capacitor 106 will be referred to as $V_{BRIDGE\_CAP}$. The voltage between electrical line 128 and ground 134 may be referred to as a bus voltage.

Figure 2A:
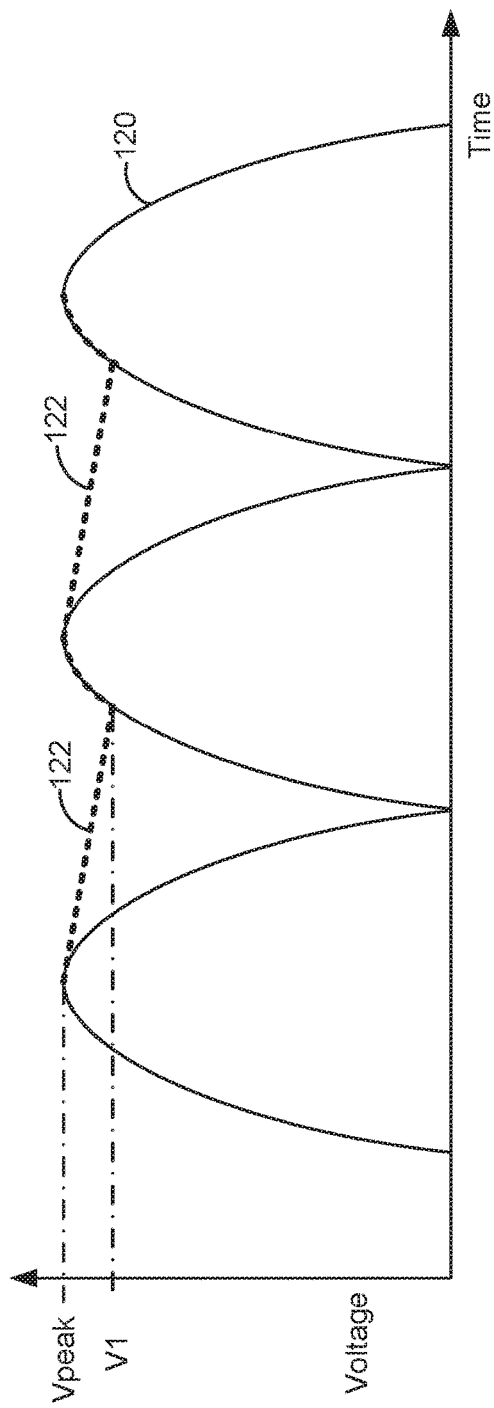
FIGS. 2A and 2B show voltages in the AC to DC converter of FIG. 1.

FIG. 2A shows a rectified voltage produced by the diode bridge of FIG. 1. As illustrated, the rectified voltage 120 is shown as produced without any other circuit elements of the AC to DC converter 100. For example, the rectified voltage 120 may be produced by the diode bridge of FIG. 1 without the bridge capacitor 106. FIG. 2A has a voltage axis and a time axis. Note that at times the magnitude of the rectified voltage 120 in FIG. 2A is too low for the DC to DC converter 108. For example, the DC to DC converter may require about 80 Volts to 90 Volts for efficient operation. In some cases, there may be a specified minimum input DC voltage for the DC to DC converter 108. Thus, the voltage at the input of the DC to DC converter 108 should be kept above the specified minimum DC voltage.

Referring again to FIG. 1, the voltage at the input of the DC to DC converter 108 can be maintained above the specified minimum DC voltage by using a bridge capacitor 106 having a suitable capacitance. Note that the bridge capacitance needed to meet a target voltage across the bridge capacitor 106 may depend on the load connected the AC to DC converter. In FIG. 1, the load is represented by load capacitor 110. Bridge capacitor 106 prevents $V_{BRIDGE\_CAP}$ from falling below the specified minimum DC voltage. Dotted line 122 in FIG. 2A shows the voltage $V_{BRIDGE\_CAP}$ under an arbitrary load condition and a first bridge capacitance. The dotted line 122 shows that the voltage $V_{BRIDGE\_CAP}$ reaches a peak of Vpeak and falls to V1.

Figure 2B:
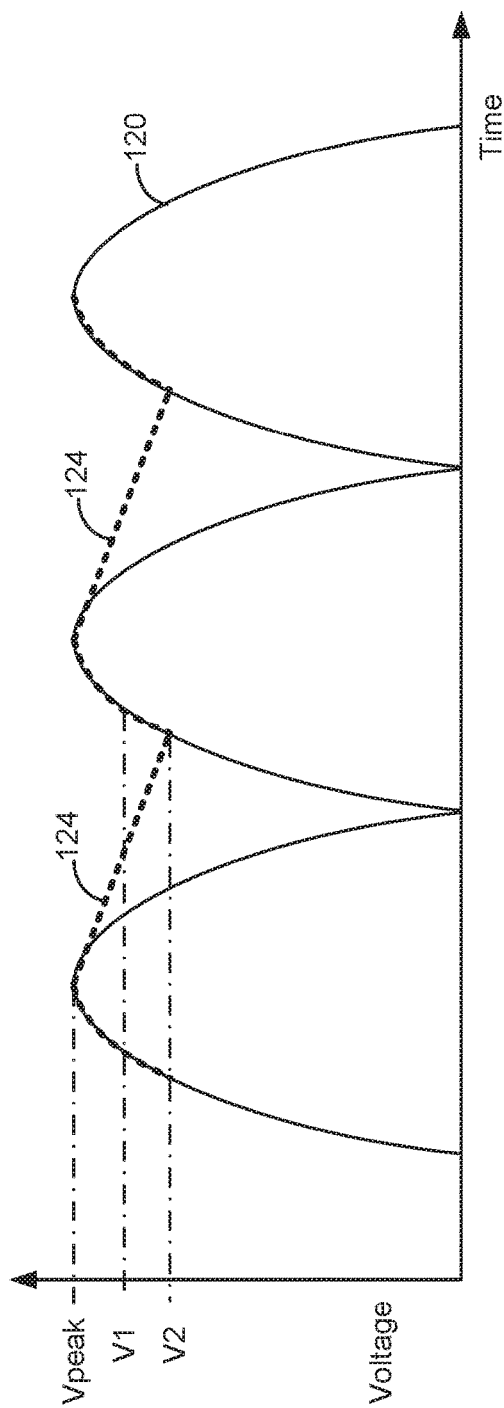

FIG. 2B depicts a voltage of the circuit of FIG. 1 under the arbitrary load condition (referenced in the example of FIG. 2A) and a second bridge capacitance. In this case, the second bridge capacitance is smaller than the first bridge capacitance (referenced in the example of FIG. 2A). More specifically, FIG. 2B shows a rectified voltage 120 that would be produced by the diode bridge of FIG. 1 by itself, without any other circuit elements of the AC to DC converter 100. Line 124 in FIG. 2B shows the voltage $V_{BRIDGE\_CAP}$ under the arbitrary load condition and a second bridge capacitance that is smaller than the first bridge capacitance. For example, the arbitrary load may be 45 Watts (W) in each case. The first bridge capacitance may be 220 micro-farads (µF), and the second bridge capacitance may be 68 µF. Note that with the smaller bridge capacitance, $V_{BRIDGE\_CAP}$ drops to V2, which is less than V1 (where V1 has the same magnitude as in FIG. 2A). As noted above, if $V_{BRIDGE\_CAP}$ drops too low, this may impair operation of the AC to DC converter. For example, DC to DC converter 108 may not operate properly or efficiently. Thus, a relatively large bridge capacitor 106 may be needed in the AC to DC converter 100. Note that for some AC to DC converters the size of a bridge capacitor at the output of the rectifier may occupy 30 percent to 60 percent of the AC to DC converter.

Thus, due to low frequency AC line voltage (e.g., 50 Hz or 60 Hz), the AC to DC converter 100 in FIG. 1 may require a very large bridge capacitor 106. For example, with a 45 W load, a 68 µF capacitor may be required to maintain the rectified voltage across bridge capacitor 106 near or above 100 V.

Moreover, characteristics of the AC power source 102 can vary depending on the geographic region. For example, in some geographic regions, AC power sources are typically 110 Volts (RMS), whereas in other geographic regions, AC voltage sources are typically 220 Volts (RMS). AC to DC adapters may be designed to operate under this wide range of voltages. This means that the peak rectified voltage ($V_{PEAK}$) could be as high as 380 V. Thus, bridge capacitor 106 has to have a minimum of 380 V voltage rating (note that typically this means a 400 V voltage rating is used). For one 400 V, 68 µF or two 400 V, 33 µF capacitors, viable economic options are to use an aluminum or electrolytic capacitor. However, aluminum or electrolytic capacitors of this voltage rating and capacitance are very large compared to rest of the components in an AC to DC adaptor, such as the one in FIG. 1.

Figure 2C:
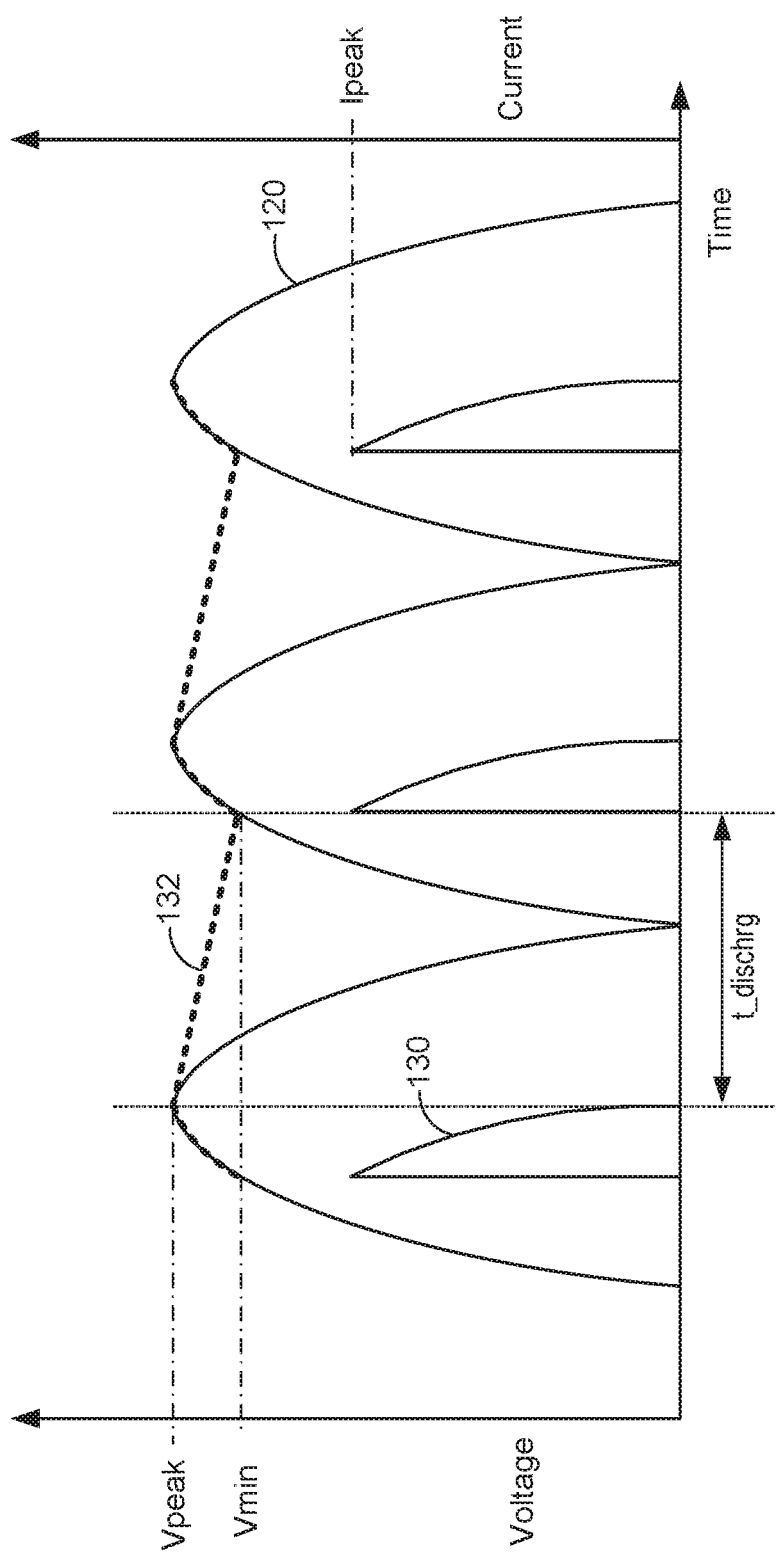
FIG. 2C shows voltages and current in the AC to DC converter of FIG. 1.

FIG. 2C shows voltage versus time and current versus time for the circuit 100 of FIG. 1. Reference is made to FIG. 2C in order to explain the need for a large bridge capacitor with the design in FIG. 1. As shown, the rectified voltage 120 produced by the diode bridge assumes there is no capacitor (e.g., bridge capacitor 106) at the output of the diode bridge, and line 132 represents the voltage $V_{BRIDGE\_CAP}$ assuming an arbitrary size bridge capacitor 106. This voltage may be referred to as the rectified DC voltage. Note that the rectified DC voltage reaches a Vpeak and falls to a Vmin (see voltage axis). Line 130 represents the current for bridge capacitor 106. A peak current (Ipeak) is labeled on the current axis.

For a low line AC input (e.g., 100 V RMS, 60 Hz), the peak rectified voltage across the bridge capacitor 106 ($V_{PEAK}$) is approximately 1.414*100 V=141.4 V. For purposes of discussion, assume the minimum required voltage across the bridge capacitor 106 ($V_{MIN}$) is 100 V. Also assume the load is a constant power of 45 W, and the DC to DC converter 108 has 90% efficiency (η). The rectified DC voltage (or bridge capacitor 106 voltage) has ripples at twice the line frequency (e.g., 120 Hz, or 8.333 ms period). The AC power source 102 provides power when the line voltage (e.g., on electrical line 128) is above 100 V and a short period of time after its peak voltage. Thus, the AC power source 102 powering time is roughly slightly less than one quarter of the each 8.333 ms period (approximately 2 ms). Therefore, the bridge capacitor 106 has to supply energy to the load for about 6.333 ms (t_dischrg) of time in each half line cycle. Assuming the capacitor voltage is near the peak voltage of 141.4 V when it starts to discharge energy to the load, then the minimum capacitance of the bridge capacitor can be estimated as in Equations 1 to 3.

$$\tfrac{1}{2} * Cbridge * (Vpeak^2 - Vmin^2) = (Power/\eta) * t\_dischrg \quad \text{(Equation 1)}$$

$$Cbridge = 2*(Power/\eta)*t\_dischrg/(Vpeak^2 - Vmin^2) \quad \text{(Equation 2)}$$

$$Cbridge = 2*(45/90\%)*6.333 \text{ m}/(141^2 - 100^2) = 64 \text{ µF} \quad \text{(Equation 3)}$$

The forgoing indicates that a single 68 µF capacitor or two 33 µF capacitors could be used for bridge capacitor 106 in FIG. 1.

Figure 3A:
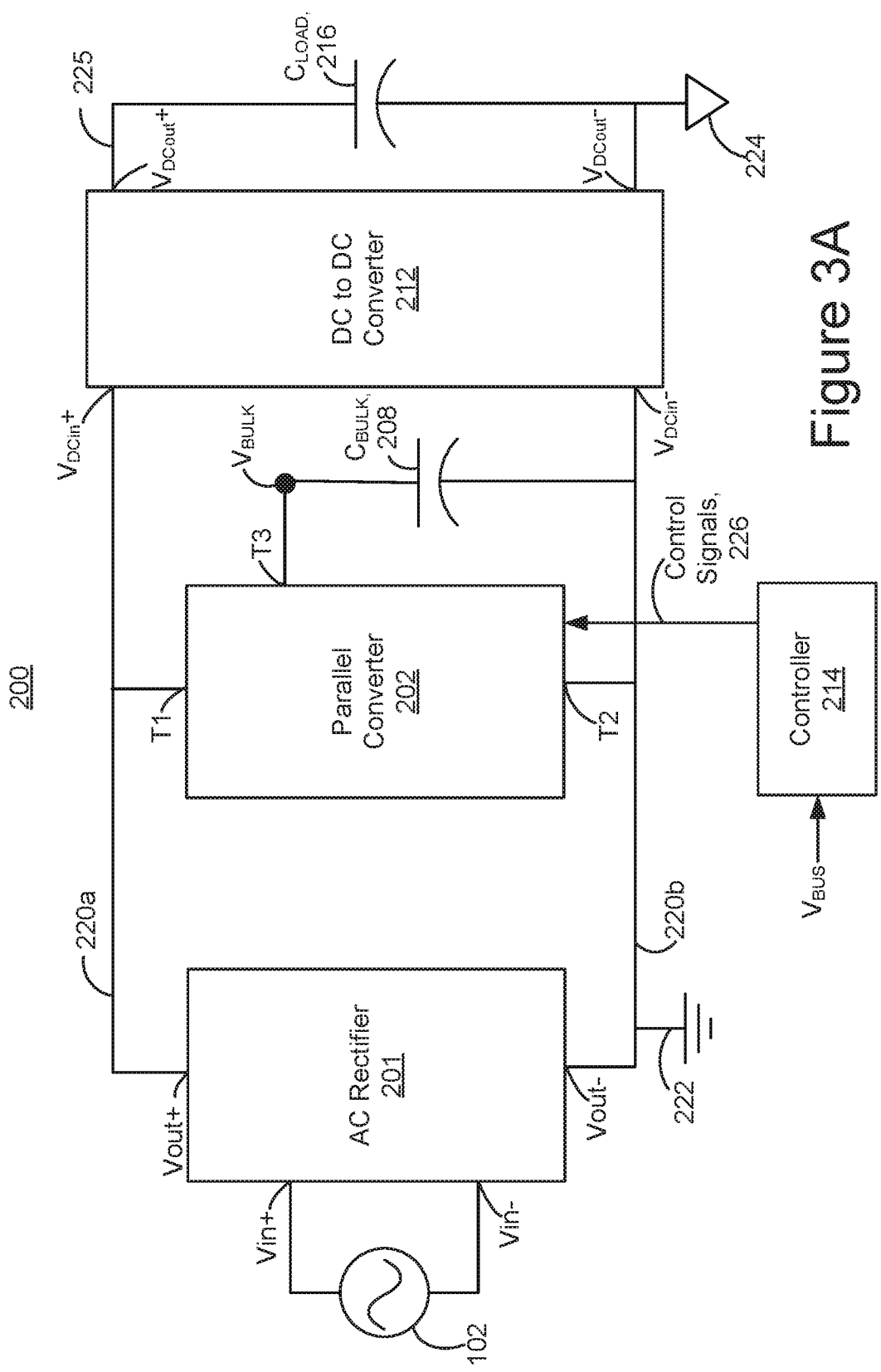
FIG. 3A is a diagram of one embodiment of an AC to DC converter having a parallel converter.

FIG. 3A is a diagram of one embodiment of an AC to DC converter having a parallel converter. The AC to DC converter 200 has a bus having a positive line 220a and a negative line 220b. The negative line 220b of the bus is connected to a first ground 222. During operation, positive line 220a is at a positive voltage relative to negative line 220b. The parallel converter 202 has a first terminal (T1) connected to the positive line 220a and a second terminal (T2) connected to the negative line 220b. Herein, this is referred to as a parallel connection (with respect to the bus). The parallel converter 202 has a third terminal (T3) connected to a bulk capacitor 208. The parallel converter 202 may have other terminals. For example, the parallel converter 202 could have multiple terminals connected to the positive line 220a and multiple terminals connected to the negative line 220b.

The parallel converter 202 is not in the main power path between the bus and the load (represented by $C_{LOAD}$ 216). For example, the parallel converter 202 is not connected between the positive line 220a and the output line 225. In other words, the parallel converter 202 is not in series with the input-to-output main power path. Therefore, parallel converter 202 causes little or no power loss. Thus, the location of the parallel converter 202 provides for high efficiency. In contrast, the DC to DC converter 212 is in the main power path. The DC to DC converter 212 has an input $V_{DCIN+}$ connected to positive line 220a, and an input $V_{DCIN-}$ connected to negative line 220b. The DC to DC converter 212 has a first output $V_{DCOUT+}$ connected to output line 225, and a second output $V_{DCOUT-}$, which is connected to second ground 224. Load capacitor 216 is connected between first output $V_{DCOUT+}$ and a second output $V_{DCOUT-}$ of the DC to DC converter 212. Also, note that the load capacitor 216 is not necessarily a part of the AC to DC converter 200, but may represent a load connected to the DC output of the AC to DC converter 200. This applies to other AC to DC converters disclosed herein, as well.

The AC to DC converter 200 has an AC rectifier 201 having an input (Vin+, Vin−) that is configured to connect to an AC power source 102. The AC power source 102 could be a power outlet as is commonly used in homes, offices, etc. The AC power source 102 provides an AC signal that has an AC voltage and an AC current. The AC rectifier 201 rectifies the input AC signal and provides a rectified signal at its one or more outputs. The AC rectifier 201 has a positive output (Vout+) and a negative output (Vout−) that provide the rectified signal (e.g., rectified voltage, rectified current) between the positive line 220a and the negative lines 220b of the bus.

AC to DC converter 200 has a bulk capacitor 208 coupled to the parallel converter 202. In this example, the bulk capacitor 208 has a first terminal connected to the negative line 220b of the bus (or first ground 222). The bulk capacitor 208 has a second terminal connected to the parallel converter 202. In this example, the second terminal connected to the parallel converter 202 is connected to terminal T3 of the parallel converter 202. The parallel converter 202 has internal components that are configured to connect the bulk capacitor 208 to the positive line 220a of bus via terminal T1 at certain times during operation, in one embodiment. Note that there could be one or more circuit components (e.g., inductor, transistor, etc.) in series with the bulk capacitor 208. Thus, the second terminal of the bulk capacitor 208 is not necessarily connected directly to the positive line 200a. Connecting the bulk capacitor 208 to the positive line 200a (with the first terminal of the bulk capacitor 208 connected to the negative line 220b) may be used to charge the bus using energy stored in the bulk capacitor 208.

Note that the bulk capacitor 208 is described herein as being connected to a terminal of the parallel converter 202 for purpose of explanation. The bulk capacitor 208 could be considered to be a part of the parallel converter 202. Hence, throughout this document whenever the bulk capacitor 208 is described as being connected to (or coupled to) the parallel converter 202, this phrase will be understood to encompass the bulk capacitor 208 being a part of the parallel converter 202. Additionally, the use of the term "connected" herein to may refer to a direct or indirect connection.

The controller 214 is configured to provide control signals 226 to control operation of the parallel converter 202. For example, control signals 226 may be used for gate voltages of transistors in the parallel converter 202. The controller 214 inputs the bus voltage between lines 220a and 220b (which may be referred to as $V_{BUS}$), in one embodiment. The controller 214 generates the control signals 226 based on $V_{BUS}$, in one embodiment. The controller 214 could generate the control signals 226 based on other signals and/or parameters.

The controller 214 operates the parallel converter 202 in a first mode in which the bulk capacitor 208 is charged by a rectified signal from the AC rectifier 201, and a second mode in which the bulk capacitor 208 is discharged to the bus, in one embodiment. In one embodiment, the bulk capacitor 208 is charged in the first mode by the rectified signal provided between Vout+ and Vout− of the AC rectifier 201.

In the first mode, the parallel converter 202 may use the rectified signal to store energy in the bulk capacitor 208. In the first mode, the voltage on the bulk capacitor 208 may be increased to a greater magnitude than the voltage between lines 220a and 220b (e.g., $V_{BUS-}$). In the second mode, the energy that was stored in the bulk capacitor 208 may be discharged to, for example, the bus. During at least an initial portion of the second mode the energy stored in the bulk capacitor 208 may be used to increase the voltage between lines 220a and 220b (e.g., $V_{BUS}$).

When the AC input voltage (absolute value) is higher than 100 V, the bulk capacitor 208 may be charged to a higher voltage than the low-line AC peak voltage, in one embodiment. For example, the bulk capacitor 208 could be charged to 380 V. Note that this is the same/similar voltage level as the high-line AC peak voltage; therefore, no voltage rating sacrifice is needed for the bulk capacitor 208. The charging period ends near the time when the AC line voltage falls to 100 V, in one embodiment. Therefore the duration that the AC power source 102 supplies energy to load is about half of the period or 4.16 m. After AC line voltage drops to 100 V (or close to), the charging process may be stopped, and energy discharge from the bulk capacitor 208 may be started, in one embodiment. The discharged energy may be used to charge the bus and the load.

The minimum required bulk capacitance for bulk capacitor 208 can be estimated in a similar manner as was discussed for bridge capacitor 106. Equations 4 and 5 below are similar to Equations 1 and 2 above, except that Cbridge has been replaced with Cbulk. Equation 6 describes a calculation that is similar to Equation 3 above. Note that one difference between the values in Equation 6 and those in Equation 3 above (used to estimate minimum required capacitance for bridge capacitor 106) are that the peak voltage on the capacitor is much higher in Equation 6 (380 V versus 141 V). A second difference is that the discharge time is shorter in Equation 6.

$$\tfrac{1}{2}*Cbulk*(Vpeak^2-Vmin^2)=(Power/\eta)*t\_dischrg \quad \text{(Equation 4)}$$

$$Cbulk=2*(Power/\eta)*t\_dischrg/(Vpeak^2-Vmin^2) \quad \text{(Equation 5)}$$

$$Cbulk=2*(45/90\%)*4.16\text{ m}/(380^2-100^2)=3\text{ }\mu F \quad \text{(Equation 6)}$$

Equation 6 shows that a single 3 µF capacitor or two 1.5 µF capacitors could be chosen for bulk capacitor 208. Note that this is much smaller than the single 68 µF capacitor or two 33 µF capacitors for bridge capacitor 106 in FIG. 1. Due to the small value of the capacitance for bulk capacitor 208, one or more ceramic capacitors can be used. Ceramic capacitors typically have a much smaller volume than electrolytic capacitors such as might be needed for bridge capacitor 106 in FIG. 1. For example, two 2.2 µF TDK C5750X6S2W225K250KA ceramic capacitors can be used. In this example, the size is 5.7 mm×5 mm×2.5 mm. In comparison, a 33 µF electrolytic capacitor might be 12.5 mm×12.5 mm×26.5 mm. The capacitor volume reduction, for this example, is approximately 98%. Even with considerations of components in the parallel converter 202 (e.g., transistors and inductor), more than 50% volume reduction from the bridge capacitor 106 in FIG. 1 can be realized.

Figure 3B:
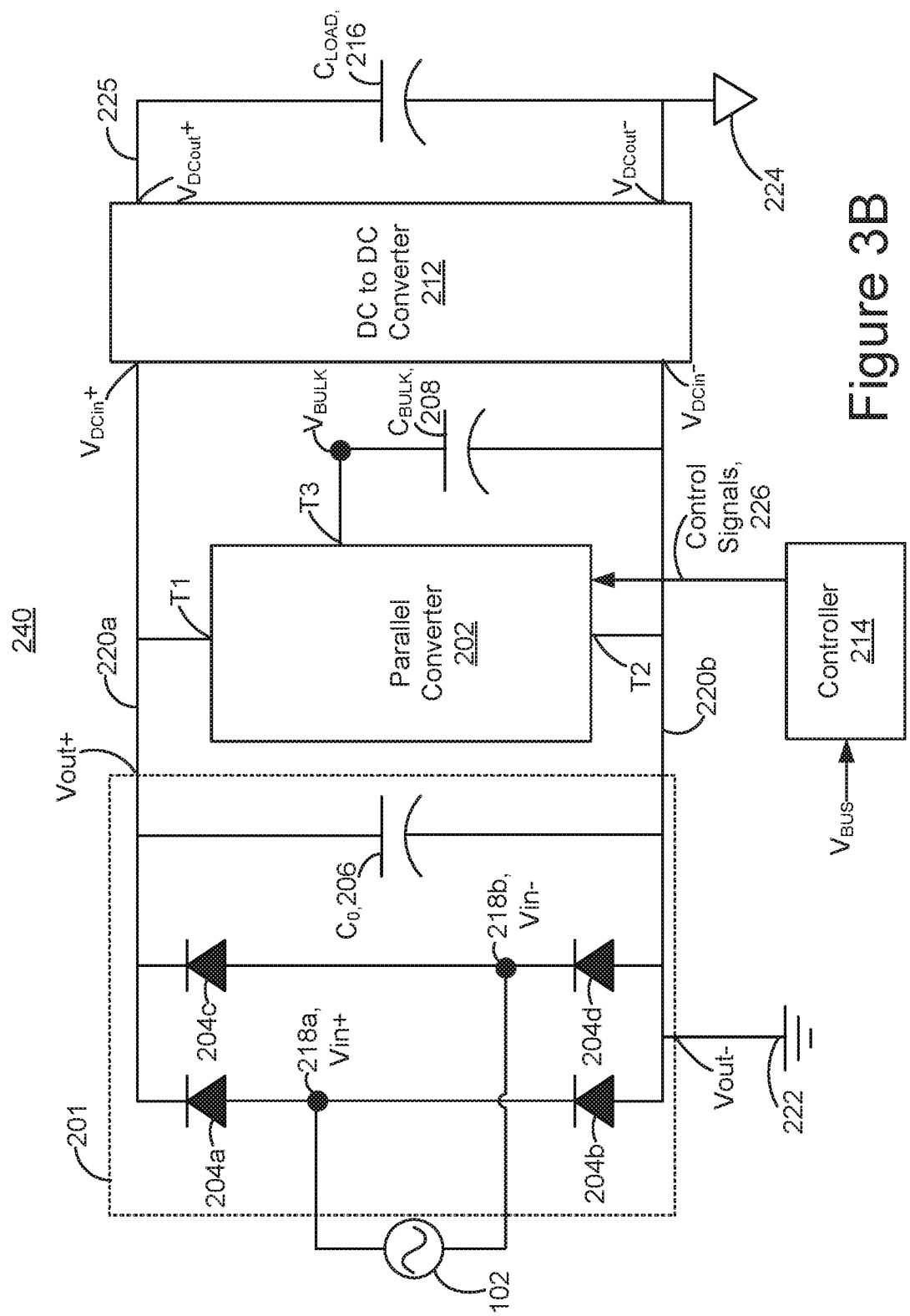
FIG. 3B is a diagram of one embodiment of an AC to DC converter having a parallel converter.

FIG. 3B is a diagram of one embodiment of an AC to DC converter having a parallel converter. The AC to DC converter 240 of FIG. 3B depicts further details of one embodiment of the AC rectifier 201. The AC rectifier 201 has a diode bridge formed from diodes 204a-204b. The diode bridge has an input having a first terminal 218a (which is Vin+) and a second terminal 218b (which is Vin−). The first terminal 218a is at the junction of the anode of diode 204a and the cathode of diode 204b. The second terminal 218b is at the junction of the anode of diode 204c and the cathode of diode 204d. The AC power source 102 is connected between the first terminal 218a and the second terminal 218b.

The diode bridge has an output between the positive line 220a and the negative line 220b of the bus. The cathodes of diodes 204a and 204c are connected to the positive line 220a. The anodes of diodes 204b and 204d are connected to the negative line 220b of the bus (also referred to as ground). A filter capacitor $C_0$ 206 is connected across the output of the diode bridge. The filter capacitor $C_0$ 206 may have a much smaller capacitance than bridge capacitor 106 in FIG. 1. For example, filter capacitor $C_0$ 206 might be just 0.1 microfarads.

Figure 4:
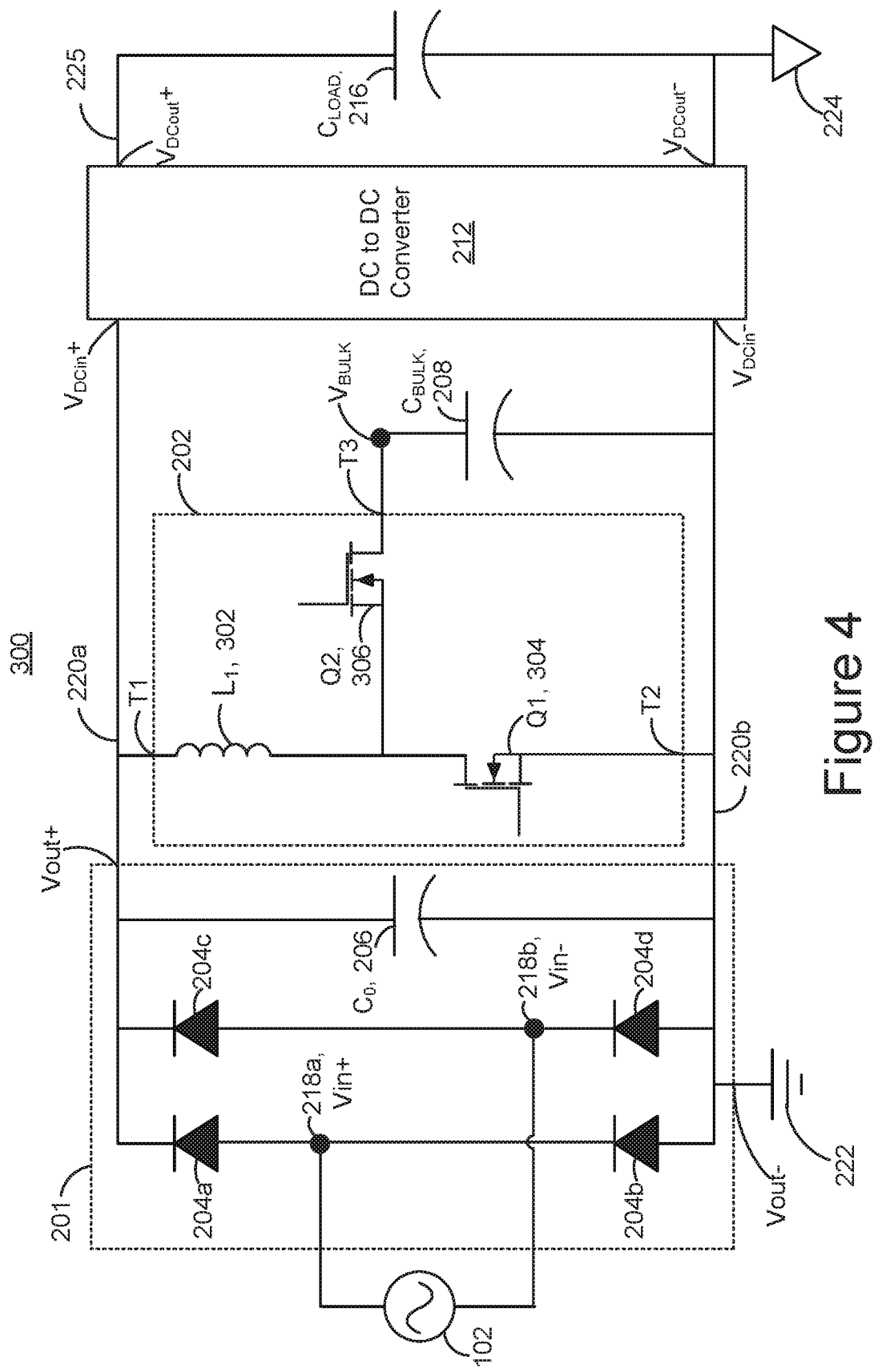
FIG. 4 is a diagram of one embodiment of an AC to DC converter.

FIG. 4 is a diagram of one embodiment of an AC to DC converter having a parallel converter. The AC to DC converter 300 in FIG. 4 is one embodiment of AC to DC converter 200 in FIG. 3A. AC to DC converter 300 in FIG. 4 is also one embodiment of AC to DC converter 240 in FIG. 3B. FIG. 4 shows further details of one embodiment of parallel converter 202. The parallel converter 202 includes inductor $L_1$ 302, switch Q1 304, and switch Q2 306. Switch Q1 304 comprises a transistor, in one embodiment. Switch Q2 306 comprises a transistor, in one embodiment. The switches Q1 304, Q2 306 may each be implemented as a metal-oxide-semiconductor field-effect transistor (MOSFET), insulated-gate bipolar transistor (IGBT), or bipolar junction transistor (bipolar transistor or BJT), but are not limited thereto. In FIG. 4, switches Q1 304, Q2 306 are depicted as NMOS devices, where the shown diodes are the inherent body diode, rather than a separate element.

In this embodiment, inductor $L_1$ 302 has one terminal connected to the positive line 220a of the bus. Note that this is also the positive terminal of the output of the AC rectifier 201. The second terminal of inductor $L_1$ 302 is connected to one terminal of switch Q1 304. The other terminal of switch Q1 304 is connected to first ground 222 (or the negative line 220b). The parallel converter 202 has switch Q2 306, which has a terminal connected to one terminal of the bulk capacitor 208 (which has its other terminal connected to first ground 222). A second terminal of switch Q2 306 is connected to the junction of inductor $L_1$ 302 and switch Q1 304.

In this configuration, the terminal of inductor $L_1$ 302 connected to the positive line is one example of terminal T1, the terminal of switch Q1 304 connected to the first ground 222 is one example of terminal T2, the terminal of switch Q2 306 connected to the bulk capacitor 208 is one example of terminal T3.

Note that the controller 214 is not depicted in FIG. 4, so as to simplify the diagram. The controller 214 may be used to provide control signals (e.g., control signals 226) for the gates of switch Q1 304 and switch Q2 306.

FIG. 5A is a timing diagram of one embodiment of voltages during operation of AC to DC converter 300 in FIG. 4. The AC input voltage 550 refers to the AC voltage provided by AC power source 102. The AC input voltage could be a low line (e.g., 110 V RMS), a high line (e.g., 220 V RMS), or some other magnitude. Note that the time between time t0 and t4 is equal to one half of the AC voltage cycle time. The bus voltage $V_{BUS}$ 556 and the bulk capacitor voltage $V_{BULK}$ 558 are also depicted. The bus voltage $V_{BUS}$ 556 refers to the voltage between lines 220a and 220b in, for example, FIG. 4. The bulk capacitor voltage $V_{BULK}$ 558 refers to the voltage across the bulk capacitor 208 in, for example, FIG. 4. Note that the bus voltage $V_{BUS}$ is not allowed to fall below $V_{MIN}$, in this embodiment. The voltage $V_{MIN}$ is the minimum voltage that is allowed on the bus in order to have proper operation of the AC to DC converter 300. For example, $V_{MIN}$ may be a minimum voltage that is specified for proper operation of the DC to DC converter 212.

The Q1 gate voltage 552 and the Q2 gate voltage 554 may be provided by the controller 214. As depicted in FIG. 5A, Q1 gate voltage is switching between time t1 and t2. However, Q1 gate voltage could begin to switch as early as time t0. The period when Q1 gate voltage is switching is referred to as a boost phase. When the Q1 gate voltage is switching, energy is stored in the bulk capacitor 208. Stated another way, bulk capacitor 208 is charged during the boost phase. The energy is provided from AC power source 102, in one embodiment. Note that the voltage on the bulk capacitor 208 rises considerably in the boost phase. Also note that $V_{BULK}$ may be considerably larger than $V_{BUS}$. For example, at its peak at time t2, $V_{BULK}$ might be 380 V, whereas $V_{BUS}$ could be near $V_{MIN}$. Note that $V_{MIN}$ might be, for example, 80 V or 90 V.

In one embodiment, the controller 214 determines when to start the boost phase based on the bus voltage $V_{BUS}$ 556. FIG. 5A shows the boost phase starting at time t1, which roughly co-insides with a local peak in the bus voltage $V_{BUS}$. Note that if the bus voltage $V_{BUS}$ is higher it may allow less current to charge the bulk capacitor 208. Hence, starting the boost phase at time t1 may be provide for efficient operation (e.g., less current is drawn). However, the controller 214 may start the boost phase earlier or later than t1.

In one embodiment, the controller 214 selects a duty cycle for operating switch Q1 304 during the boost phase. The duty cycle refers to the percentage of time that switch Q1 304 is on. This duty cycle can be kept fixed throughout the boost phase, or changed during the boost phase. For example, the controller 214 could use a lower duty cycle in the beginning of the boost phase to reduce in-rush current. The controller 214 increases the duty cycle later in the boost mode, in one embodiment.

As depicted in FIG. 5A, Q2 gate voltage is switching between time t2' and t3. However, Q2 gate voltage could continue to switch as late as time t4. The time between t2' and t3 is a buck phase. In other words, the buck phase occurs when Q2 is switching. When the Q2 gate voltage is switching, the energy that was stored in the bulk capacitor 208 in the boost phase is transferred from the bulk capacitor 208 to, for example, the bus. Stated another way, bulk capacitor 208 is discharged during the buck phase. Note that the voltage on the bus $V_{BUS}$ rises sharply at time t2'. Thus, the bus voltage $V_{BUS}$ 556 can be charged very rapidly during an initial portion of the buck phase.

In one embodiment, the controller 214 determines when to start the buck phase based on the bus voltage $V_{BUS}$ 556. In one embodiment, the controller 214 selects a duty cycle for operating switch Q2 308 during the buck phase. The duty cycle here refers to the percentage of time that switch Q2 308 is on. This duty cycle can be kept fixed throughout the buck phase, or adjusted during the buck phase. For example, the controller 214 could use a lower duty cycle in the beginning of the buck phase to reduce in-rush current. The controller 214 increases the duty cycle later in the buck mode, in one embodiment. The controller 214 decreases the duty cycle later in the buck mode, in one embodiment. For example, after the bus voltage $V_{BUS}$ reaches some target (e.g., a maximum voltage at which the bulk capacitor 208 is rated), the controller 214 may decrease the duty cycle to maintain the bus voltage $V_{BUS}$.

The time between t3 and t4 is referred to as a shorting phase, in this embodiment. During the shorting phase, switch Q2 306 is on, in this embodiment. However, switch Q1 is off in the shorting phase. Note that the shorting phase could be extended to time t5. However, the shorting phase should not overlap with the boost phase. Note that because neither of the switches Q1, Q2 is switching during the shorting phase, energy is not consumed switching transistors in switches Q1, Q2. During the shorting phase, $V_{BULK}$ 558 and $V_{BUS}$ 556 fall. Note that the bulk capacitor 208 may provide energy to the load during the shorting phase (as well as during a portion of the buck phase).

FIG. 5B is a timing diagram of another embodiment of voltages during operation of AC to DC converter 300 in FIG. 4. The AC input voltage 560 refers to the AC voltage provided by AC power source 102. The bus voltage $V_{BUS}$ 566 refers to the voltage between lines 220a and 220b in, for example, FIG. 4. The bulk capacitor voltage $V_{BULK}$ 568 refers to the voltage across the bulk capacitor 208 in, for example, FIG. 4. In this example, the buck phase is depicted as being extended from t2' until the bus voltage $V_{BUS}$ 566 reaches $V_{MIN}$ (at time t3). A shorting phase may follow between times t3 and t4 (in which switch Q2 306 is on and switch Q1 304 is off). Note that there are other variations of how to apply voltages to switch Q1 304 and switch Q2 306. The Q1 gate voltage 562 and the Q2 gate voltage 564 may be provided by the controller 214.

There are many ways to control the gates of the switches Q1 304, Q2 306, during the boost mode and the buck mode. In the examples in FIGS. 5A and 5B, the switch Q2 306 may be off during the boost mode. However, switch Q2 306 may have a body diode that is forward biased during at least a portion of the boost mode. FIG. 5C depicts one embodiment of a synchronous operation mode in which switch Q1 304 and switch Q2 306 turn on and turn off complimentarily with necessary deadtime between the two switches for better efficiency. The Q1 gate voltage 572 and the Q2 gate voltage 574 may be provided by the controller 214. In the embodiment of FIG. 5C, switch Q2 306 is off whenever switch Q1 304 is on during the boost phase. However, switch Q2 306 is on most of the time when switch Q1 is off during the boost phase. There may be some brief periods in which neither switch Q1 304 or Q2 306 is on during the boost phase. For example, reference arrows 576a and 576b point to brief periods in which neither switch Q1 nor Q2 is on.

Note that in FIGS. 5A and 5B, some noise is depicted for the bus voltage $V_{BUS}$ during the boost phase and the early part of the buck phase. A small amount of noise can easily be tolerated. To reduce this noise, the capacitance of capacitor $C_0$ 206 can be increased.

Figure 6A:
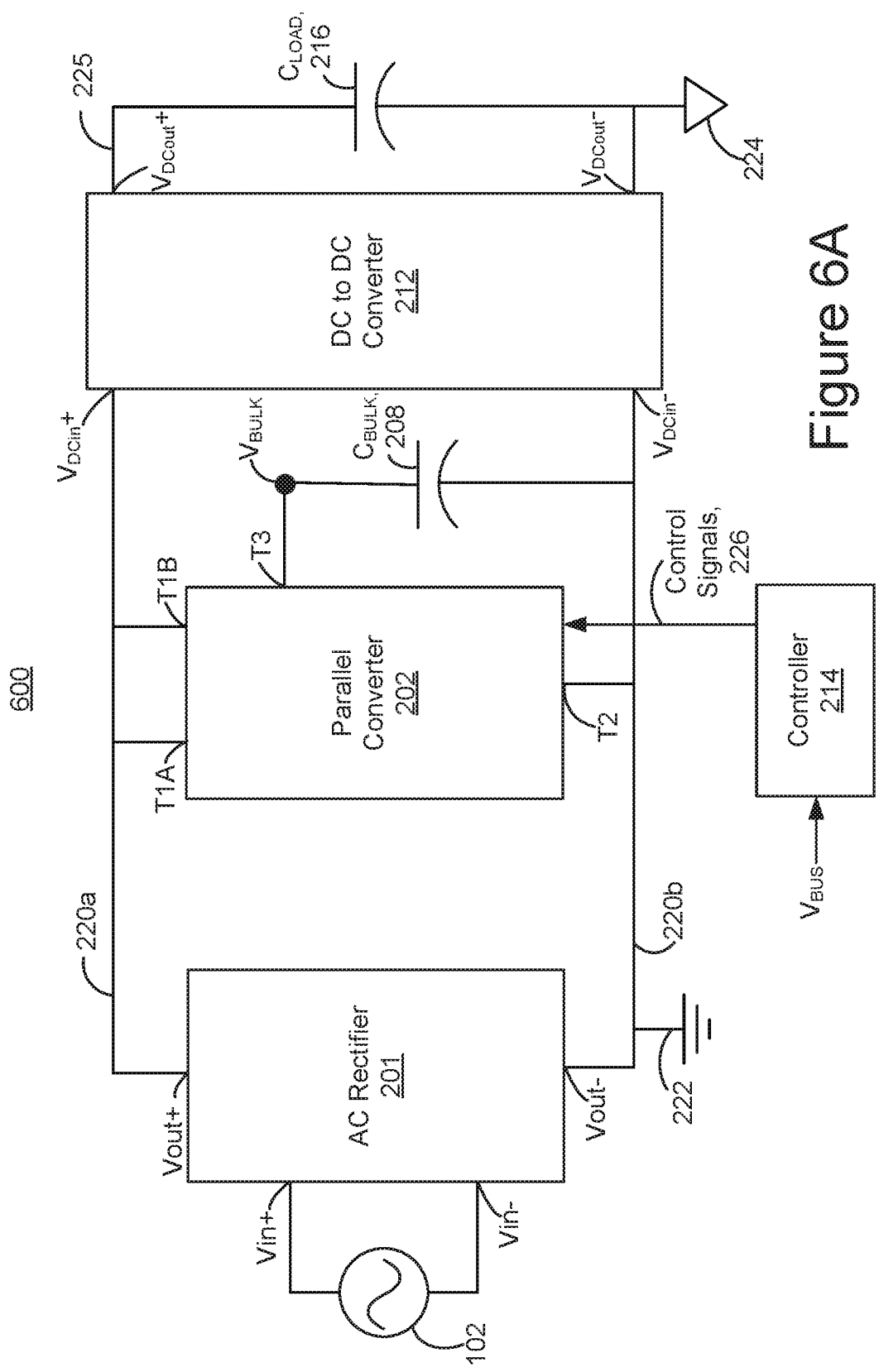
FIG. 6A depicts one embodiment of an AC to DC converter in which the parallel converter 202 has two terminals connected to the positive line of the bus.

Note that in the embodiments of FIGS. 3A and 3B, the terminal T1 may be used for two functions. One is to transfer energy from the AC rectifier 201 to the bulk capacitor 208 when in a boost phase. In other words, the bulk capacitor 208 may be charged during the boost phase by connecting the bulk capacitor 208 to the AC rectifier 201. Another function is to transfer the stored energy from the bulk capacitor 208 to the bus. FIG. 6A depicts one embodiment in which the parallel converter 202 has two terminal T1A and T1B connected to the positive line 220. Terminal T1A may be used to transfer energy from the AC rectifier 201 to the bulk capacitor 208 when in a boost phase. Terminal T1B may be used to transfer the stored energy from the bulk capacitor 208 to the bus.

Figure 6B:
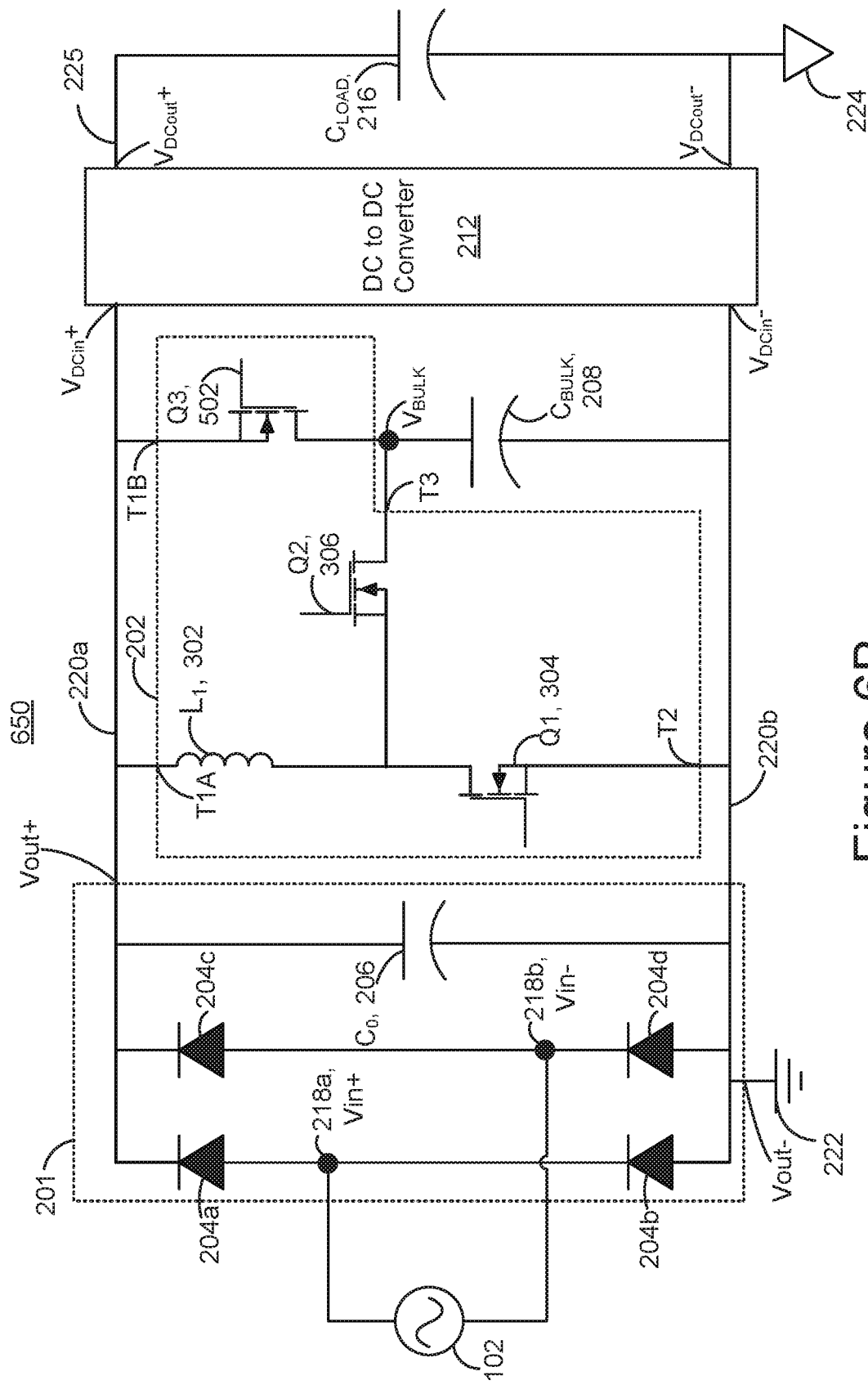
FIG. 6B is a diagram of one embodiment of an AC to DC converter, which is one embodiment of AC to DC converter 600 in FIG. 6A.

FIG. 6B is a diagram of one embodiment of an AC to DC converter. The AC to DC converter 650 of FIG. 6B is one embodiment of the AC to DC converter 600 in FIG. 6A. FIG. 6B shows further details of one embodiment of parallel converter 202. The parallel converter 202 has switch Q3 502, which is connected between the positive line 220a of the bus and the bulk capacitor 208. Switch Q3 502 comprises a transistor, in one embodiment. Switch Q3 502 may be implemented as a metal-oxide-semiconductor field-effect transistor (MOSFET), insulated-gate bipolar transistor (IGBT), or bipolar junction transistor (bipolar transistor or BJT), but is not limited thereto. In FIG. 6B, switch Q3 502 is depicted as an NMOS devices where the shown diode is the inherent body diode, rather than a separate element. During a shorting phase, switch Q3 502 may be used to short a terminal of the bulk capacitor 208 to the positive line 220a of the bus (note that the other terminal of bulk capacitor is connected to the negative line 220b of bus. Note switch Q3 502 provides a path between the bulk capacitor 208 and positive line 220a of the bus that is an alternative to a path through switch Q2 306 and inductor L1 302.

The controller 214 is not depicted in FIG. 6B, so as to simplify the diagram. The controller 214 may provide control signals (e.g., control signals 226) to the gates of switch Q1 304, switch Q2 306, and switch Q3 502. In one embodiment, the controller 214 operates the parallel converter 202 in a boost mode in which switch Q1 304 is switched to store energy in the bulk capacitor 208. This energy may be provided by the AC power source 102.

The controller 214 operates the parallel converter 202 in a shorting mode in which switch Q3 302 connects (e.g., shorts) the bulk capacitor 208 to positive line 220a of the bus to transfer the energy that was stored during the boost phase to the bus, in the present embodiment. Note that in one embodiment, switch Q2 306 is off in the shorting mode. Note that switch Q2 306 may be replaced by a diode with its anode connected at the junction of inductor L1 302 and switch Q1 304, and its cathode connected at the junction of switch Q3 502 and the bulk capacitor 208.

Figure 7:
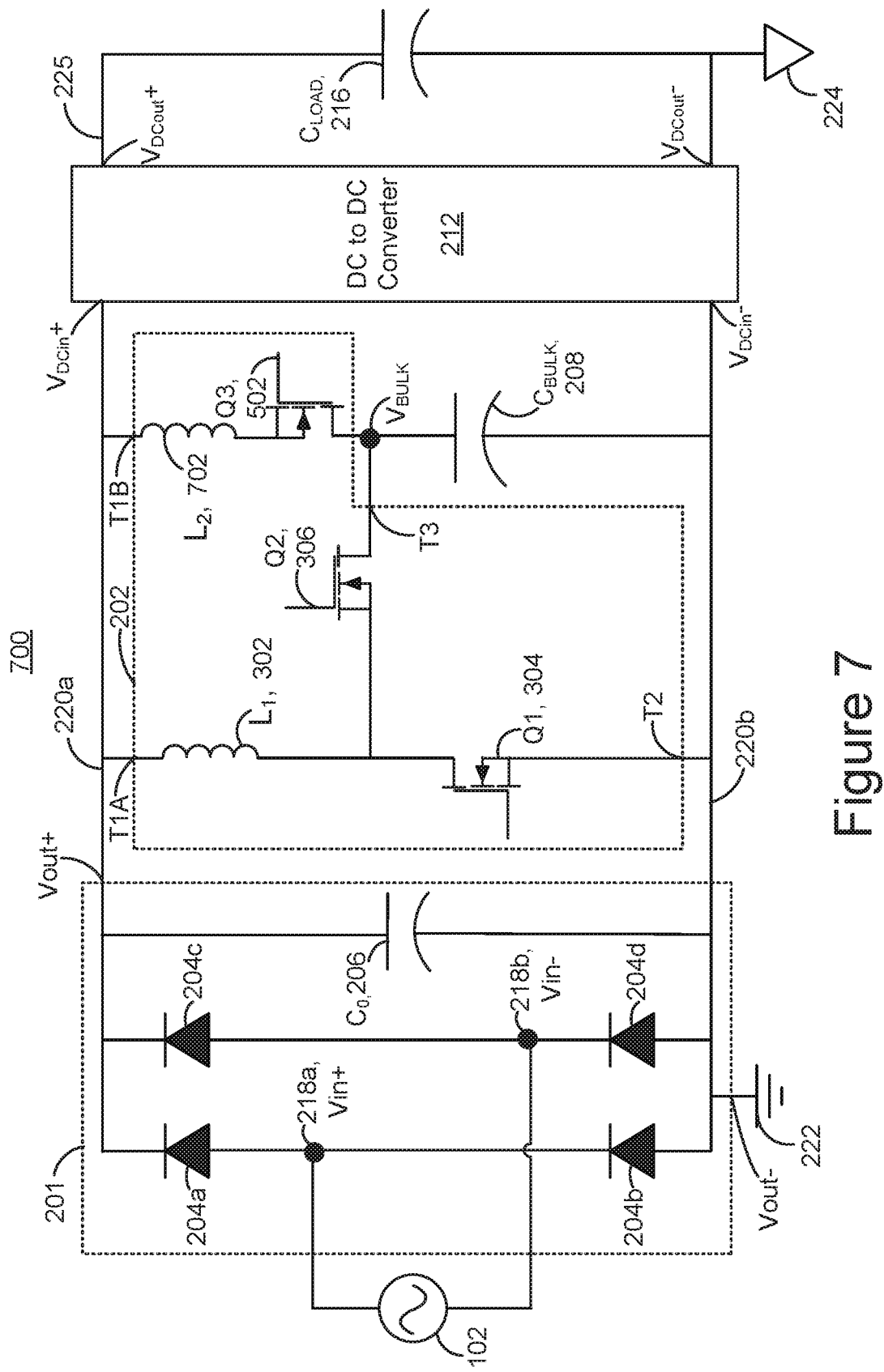
FIG. 7 is a diagram of one embodiment of an AC to DC converter, which is one embodiment of AC to DC converter 600 in FIG. 6A.

FIG. 7 is a diagram of one embodiment of an AC to DC converter. The AC to DC converter 700 of FIG. 7 is one embodiment of AC to DC converter 600 in FIG. 6A. FIG. 7 shows further details of one embodiment of parallel converter 202. The parallel converter 202 is similar to the parallel converter 202 of FIG. 6B, but has an inductor 702 between switch Q3 502 and the bus. During a shorting phase, switch Q3 502 and inductor L2 702 provide a path to connect (e.g., short) the bulk capacitor 208 to the bus. Inductor L2 702 helps to reduce turn on in-rush current when switch Q3 502 is turned on. Inductor L2 702 can be a very small inductor, such as 100 nano-henries. As with AC to DC converter 650, switch Q2 306 can be a diode with its anode connected at the junction of inductor L1 302 and switch Q1 304, and its cathode connected at the junction of switch Q3 502 and the bulk capacitor 208.

The controller 214 is not depicted in FIG. 7, so as to simplify the diagram. The controller 214 may provide control signals (e.g., control signals 226) to the gates of switch Q1 304, switch Q2 306, and switch Q3 502. Operation of AC to DC converter 700 may be similar to AC to DC converter 650. In one embodiment, the controller 214 operates the parallel converter 202 in a boost mode in which switch Q1 304 is switched to store energy in the bulk capacitor 208. This energy may be provided by the AC power source 102. The controller 214 operates the parallel converter 202 in a shorting mode in which switch Q3 302 and inductor 702 short the bulk capacitor 208 to the bus to transfer the energy that was stored during the boost phase to the bus, in the present embodiment.

Figure 8:
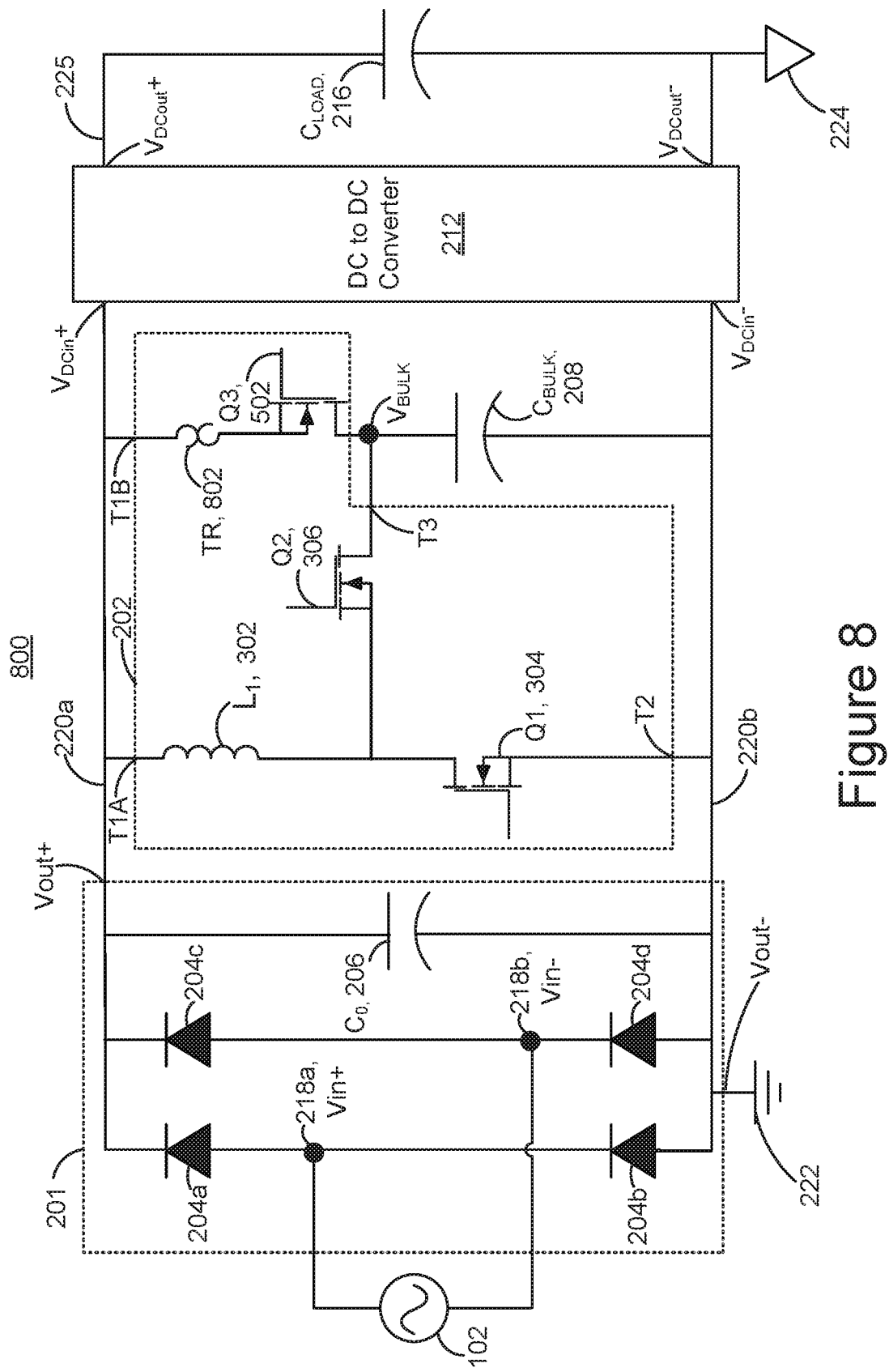
FIG. 8 is a diagram of one embodiment of an AC to DC converter, which is one embodiment of AC to DC converter 600 in FIG. 6A.

FIG. 8 is a diagram of one embodiment of an AC to DC converter. The AC to DC converter 800 of FIG. 8 is one embodiment of the AC to DC converter 600 in FIG. 6A. FIG. 8 shows further details of one embodiment of parallel converter 202. The parallel converter 202 is similar to the one of FIG. 6B, but adds a thermistor 802 between switch Q3 502 and the bus. During a shorting phase, switch Q3 502 and thermistor 802 provide a path to short the bulk capacitor 208 to positive line 220a of the bus. The thermistor 802 resistance increases significantly when conducting a large current. Thus, the thermistor 802 helps to reduce turn on in-rush current when switch Q3 502 is turned on. As with AC to DC converter 650, switch Q2 306 can be a diode with its anode connected at the junction of inductor L1 302 and switch Q1 304, and its cathode connected at the junction of switch Q3 502 and the bulk capacitor 208.

The controller 214 is not depicted in FIG. 8, so as to simplify the diagram. The controller 214 may provide control signals (e.g., control signals 226) to the gates of switch Q1 304, switch Q2 306, and switch Q3 502. In one embodiment, the controller 214 operates the parallel converter 202 in a boost mode in which switch Q1 304 is switched to store energy in the bulk capacitor 208. This energy may be provided by the AC power source 102. The controller 214 operates the parallel converter 202 in a shorting mode in which switch Q3 302 and thermistor 802 short the bulk capacitor 208 to the bus to transfer the energy that was stored during the boost phase to the bus, in the present embodiment.

Still another alternative for reducing in-rush current in switch Q3 502 is to control the current of switch Q3 502 with current limiting and/or a soft start. For example, controller 214 can be configured to control the rate at which switch Q3 502 turns on by a ramp rate of a signal applied to the gate of switch Q3 502.

FIG. 9 depicts one embodiment of voltages during operation of various embodiments of AC to DC converters. The voltages may occur during operation of AC to DC converters 650, 700, and/or 800, but is not limited thereto. FIG. 9 shows the AC voltage input 950. The bus voltage $V_{BUS}$ 956 refers to the voltage between lines 220a and 220b in, for example, FIG. 6B, 7, or 8. The bulk capacitor voltage $V_{BULK}$ 958 refers to the voltage across the bulk capacitor 208 in, for example, FIG. 6B, 7, or 8. The time between time t1 and t3 is equal to one half cycle of the AC input voltage. FIG. 9 shows the voltage 952 applied by controller 214 to the gate of switch Q1 304. Note that switch Q1 304 is switching between times t1 and t2. This is a boost phase similar as has been described with respect to FIG. 5A. The boost phase may begin as early as time t0. As with AC to DC converter 650, switch Q2 306 can be a diode (with the anode connected to the junction of inductor L1 302 and switch Q1 304, and cathode connected to the junction of switch Q3 502 and the bulk capacitor 208).

FIG. 9 shows the voltage 954 applied by controller 214 to the gate of switch Q3 502. Switch Q3 502 is turned on between times t2' to t3, which is referred to as a shorting phase. The shorting phase could extended to time t4. However, note that the shorting phase should not overlap with the boost phase. During the shorting phase, the bulk capacitor 208 is shorted to the bus. Thus, the energy stored in the bulk capacitor 208 in the boost phase may be used to increase the voltage on the bus during the shorting phase. Some of the energy stored in the bulk capacitor 208 in the boost phase may also be provided to the load during the shorting phase.

Figure 10A:
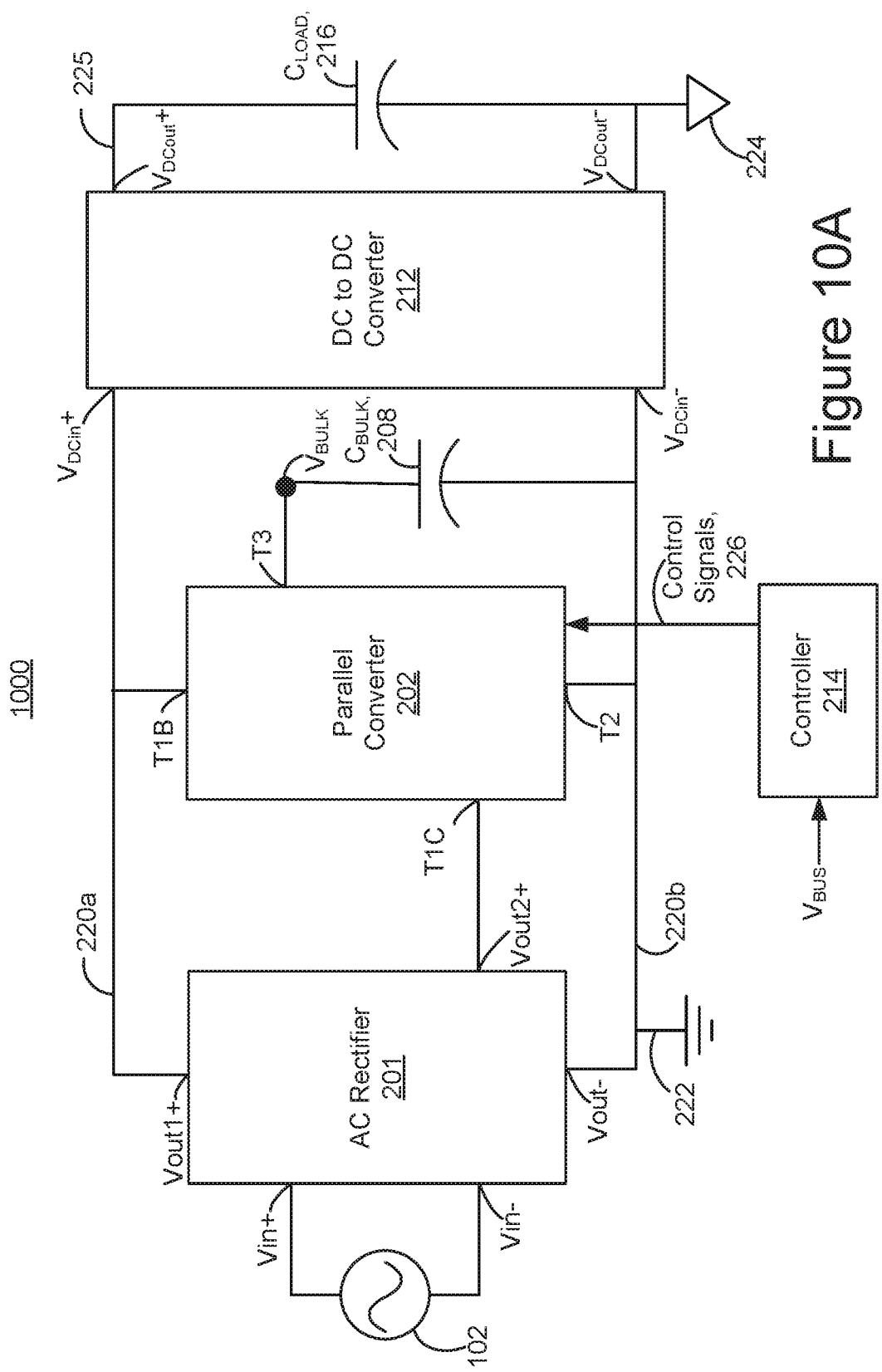
FIG. 10A is a block diagram of one embodiment of an AC to DC converter.

In the embodiments of FIGS. 3A, 3B, 4, 6A, 6B, 7, and 8, the positive line 220a of the bus was used to provide a path from the AC rectifier 201 to charge the bulk capacitor 208. In one embodiment, the bulk capacitor 208 is charged without going through the positive line 220a of the bus. FIG. 10A depicts one embodiment in which the AC rectifier 201 has a first positive output (Vout1+) connected to the positive line 220a of bus, and a second positive output (Vout2+) that is connected to one of the terminals (T1C) of the parallel converter 202, in order to provide the rectified signal to the parallel converter 202.

Figure 10B:
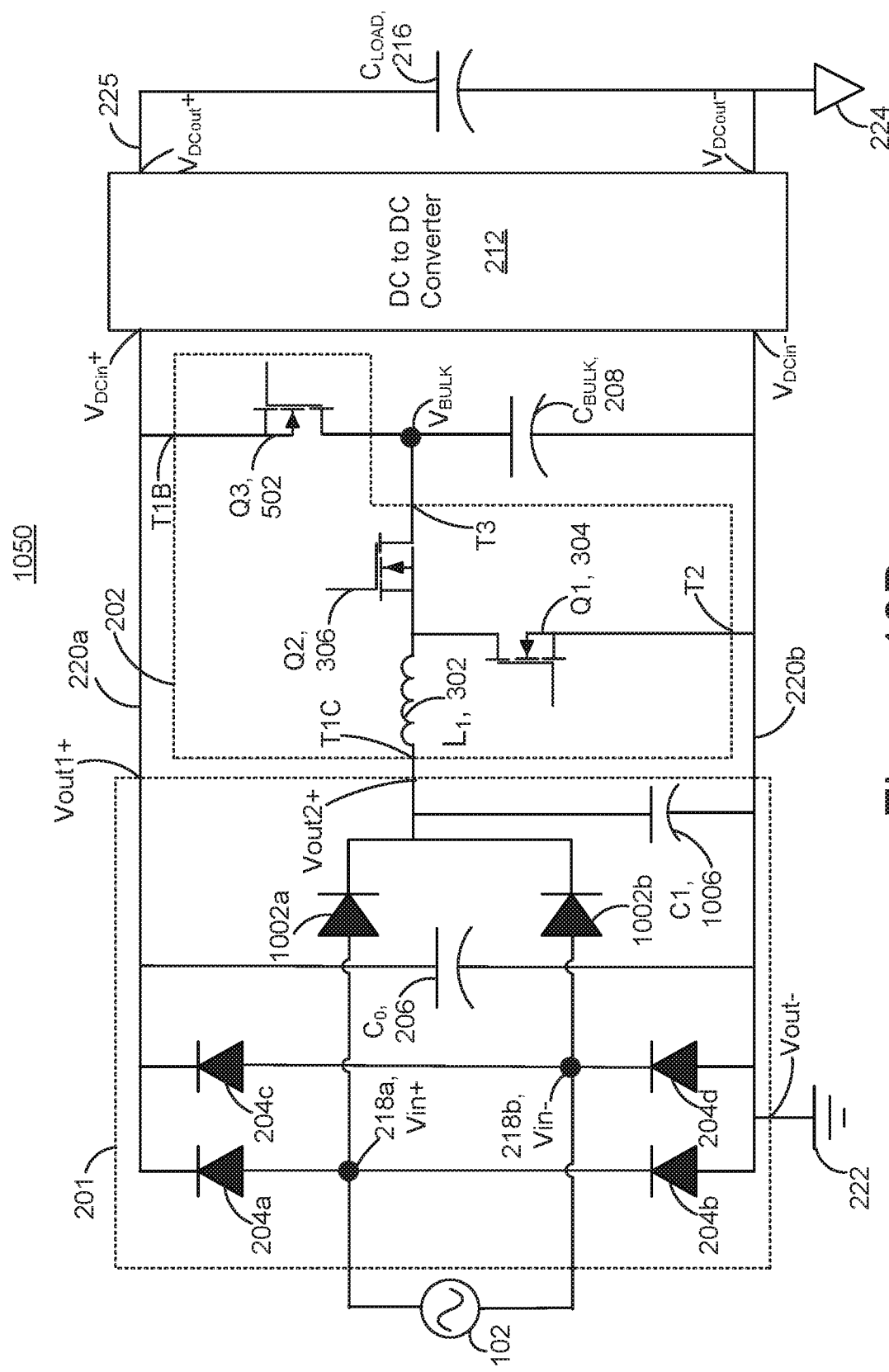
FIG. 10B is a schematic diagram of one embodiment of an AC to DC converter, which is one embodiment of AC to DC converter in FIG. 10A.

FIG. 10B is a diagram of one embodiment of an AC to DC converter. The AC to DC converter 1050 of FIG. 10B is one embodiment of AC to DC converter 1000 in FIG. 10A. AC to DC converter 1050 is one embodiment in which the optional connection between the AC rectifier 201 and terminal T1C of the parallel converter 202 is used to provide energy from the AC rectifier 201 to charge the bulk capacitor 208.

The AC rectifier 201 adds diodes 1002a and 1002b relative to the AC rectifier 201 in, for example, FIG. 6B. The anode of diode 1002a is connected to the anode of diode 204a. The cathode of diode 1002a is connected to one terminal of inductor L1 302. The anode of diode 1002b is connected to the anode of diode 204d. The cathode of diode 1002b is connected to one terminal of inductor L1 302. The AC rectifier 201 also has capacitor C1 1006 connected between the cathodes of diodes 1002a, 1002b and first ground 222. The diode bridge formed by diodes 204a-204d provides a current path to provide power to the DC to DC converter 212, in one embodiment. Diodes 1002a, 1002b provide a current path to charge the bulk capacitor 208, in one embodiment.

Inductor L1 302 has one terminal connected to one terminal of switch Q1 304, and one terminal of switch Q2 306, which is similar to AC to DC converter 650. However, the other terminal of inductor L1 302 is connected to the cathodes of diodes 1002a, 1002b, instead of to the positive line 220a of the bus. Thus, the AC rectifier 201 is able to provide the rectified voltage to the parallel converter 202 via the connection to inductor L1 302. Thus, during a boost mode, the parallel converter 202 stores energy in the bulk capacitor 208 using the rectified signal at terminal T1C. Also note that switch Q3 502 has one terminal to the positive line 220a of the bus. Thus, switch Q3 502 may be used to connect the bulk capacitor 208 to the bus during a shorting phase. As with AC to DC converter 650, switch Q2 306 can be a diode with its anode connected at the junction of inductor L1 302 and switch Q1 304, and its cathode connected at the junction of switch Q3 502 and the bulk capacitor 208.

The timing of voltages for AC to DC converter 1050 may be as depicted in FIG. 9, in one embodiment. Thus, controller 214 may turn switch Q1 304 on and off during the boost phase (e.g., t1 to t2). The controller 214 may turn on switch Q3 502 during the shorting phase (e.g., t2' to t3). Note that switch Q2 306 may be replaced by a diode, Many variations of the AC to DC converter 1050 are possible. For example, an inductor such as inductor L2 702 in AC to DC converter 650 may be added in a similar position in AC to DC converter 1050. As another example, a thermistor such as thermistor 802 in AC to DC converter 700 may be added in a similar position in AC to DC converter 1050.

There are many possible variations to the parallel converters 202 depicted in FIGS. 3A, 3B, 4, 6A, 6B, 7, 8, 10A, and 10B. The step up during the boost phase can be any multiple including, but not limited to 2×, 3×, 4×. In one embodiment, the parallel converter 202 is implemented using switch capacitors (e.g., a charge pump). Therefore, in some embodiments, the parallel converter 202 does not employ inductor L1 302.

Figure 11:
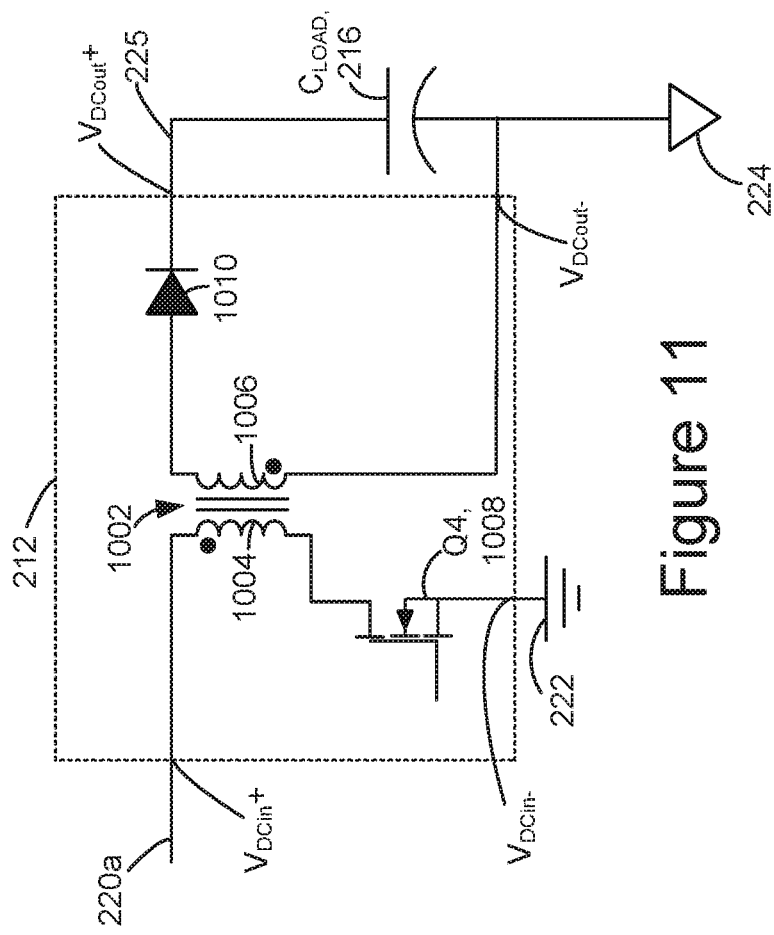
FIG. 11 is one example of a DC to DC converter that may be used for the DC to DC converter in any of the AC to DC converters disclosed herein.

FIG. 11 is one example of a DC to DC converter that may be used for the DC to DC converter 212 in any of the AC to DC converters disclosed herein. Note that the DC to DC converter 212 in FIG. 11 is just one example of a circuit for the DC to DC converter 212 in any of the AC to DC converters disclosed herein. The DC to DC converter 212 has a transformer 1002 having a primary winding 1004 and a secondary winding 1006. The primary winding 1004 has an upper tap connected to the positive line 220a of the bus, and a lower tap connected to one terminal of switch Q4 1008. Switch Q4 1008 comprises a transistor, in one embodiment. Another terminal of switch Q4 is connected to first ground 222. Note that this may be the same ground as in the main portion of the AC to DC converter.

The upper tap of the secondary winding 1006 is connected to the anode of diode 1010. The cathode of diode 1010 is connected to the load capacitor 216. The lower tap of the secondary winding 1006 is connected to the second ground 224 (as well as to one terminal of the load capacitor 216). Note that the transformer provides electrical isolation between the main portion of the AC to DC converter and the load capacitor 216. Also, the second ground 224 (connected to the secondary winding 1006) is typically a different ground than the first ground 222 of the main portion of the AC to DC converter (which is connected to the primary winding 1004 via switch Q4).

There are many possible alternatives to the example of a DC to DC converter 212 in FIG. 10. One option is to replace diode 1010 with an active power switch, which may provide higher efficiency. In one embodiment, the DC to DC converter 212 is a flyback converter. In one embodiment, the DC to DC converter 212 is a quasi-resonant (QR) flyback converter. In one embodiment, the DC to DC converter 212 is an active-clamp flyback (ACF) converter.

Figure 12:
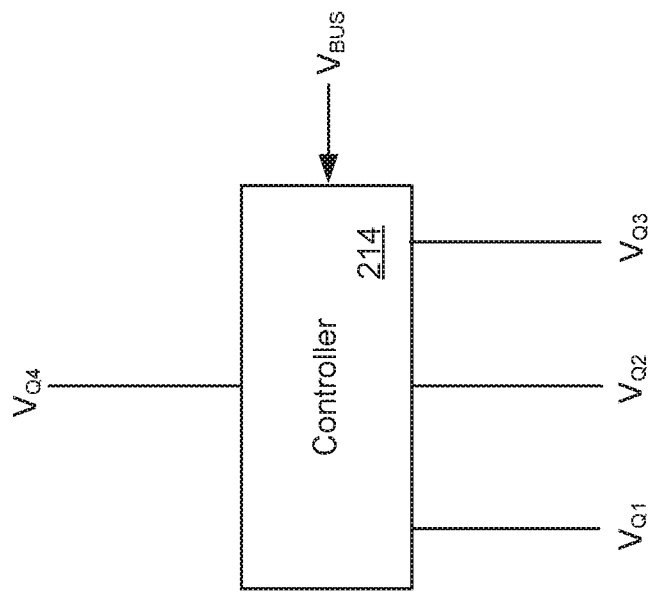
FIG. 12 is a diagram of one embodiment of a controller in an AC to DC converter, showing example control signals output by the controller.

FIG. 12 is a diagram of one embodiment of controller. The diagram of the controller 214 of FIG. 12 shows example control signals output by the controller 214. The controller 214 inputs the bus voltage $V_{BUS}$ and outputs voltages $V_{Q1}$, $V_{Q2}$, $V_{Q3}$, and $V_{Q4}$. One or more of these voltages may be used for control signals 226 in the circuits of FIG. 3A, 3B, 4, 6A, 6B, 7, 8, 10A, or 10B. $V_{Q1}$ is provided to the gate of switch Q1 304, in one embodiment. $V_{Q2}$ is provided to the gate of switch Q2 306, in one embodiment. $V_{Q3}$ is provided to the gate of switch Q3 502, in one embodiment. $V_{Q4}$ is provided to the gate of switch Q4 1008, in one embodiment.

In one embodiment, the controller 214 is implemented as an integrated circuit chip with a number of pins. One pin may be used to monitor an input voltage. This pin may be used to monitor $V_{BUS}$. Several pins may be used to provide the gate voltages $V_{Q1}$, $V_{Q2}$, $V_{Q3}$, and/or $V_{Q4}$. Internally, the chip may contain an Application Specific Integrated Circuit (ASIC), which is configured to generate gate voltages $V_{Q1}$, $V_{Q2}$, $V_{Q3}$, and/or $V_{Q4}$ in response to $V_{BUS}$. The controller 214 may use inputs other than $V_{BUS}$ to determine the proper waveform for gate voltages $V_{Q1}$, $V_{Q2}$, $V_{Q3}$ and/or $V_{Q4}$. The controller 214 may include a comparator, which it may use to compare $V_{BUS}$ to a reference voltage. The controller 214 may include a state machine or the like that controls the timing of the voltages $V_{Q1}$, $V_{Q2}$, $V_{Q3}$, and/or $V_{Q4}$ responsive to conditions such as the magnitude of $V_{BUS}$. The controller 214 may generate the voltages $V_{Q1}$, $V_{Q2}$, $V_{Q3}$, and/or $V_{Q4}$ based on conditions and/or parameters other than the magnitude of $V_{BUS}$. The controller 214 may generate the Q1 Gate voltage, Q2 Gate Voltage, Q3 Gate Voltage, as depicted and described with respect to FIGS. 5A, 5B, and 9.

Figure 13:
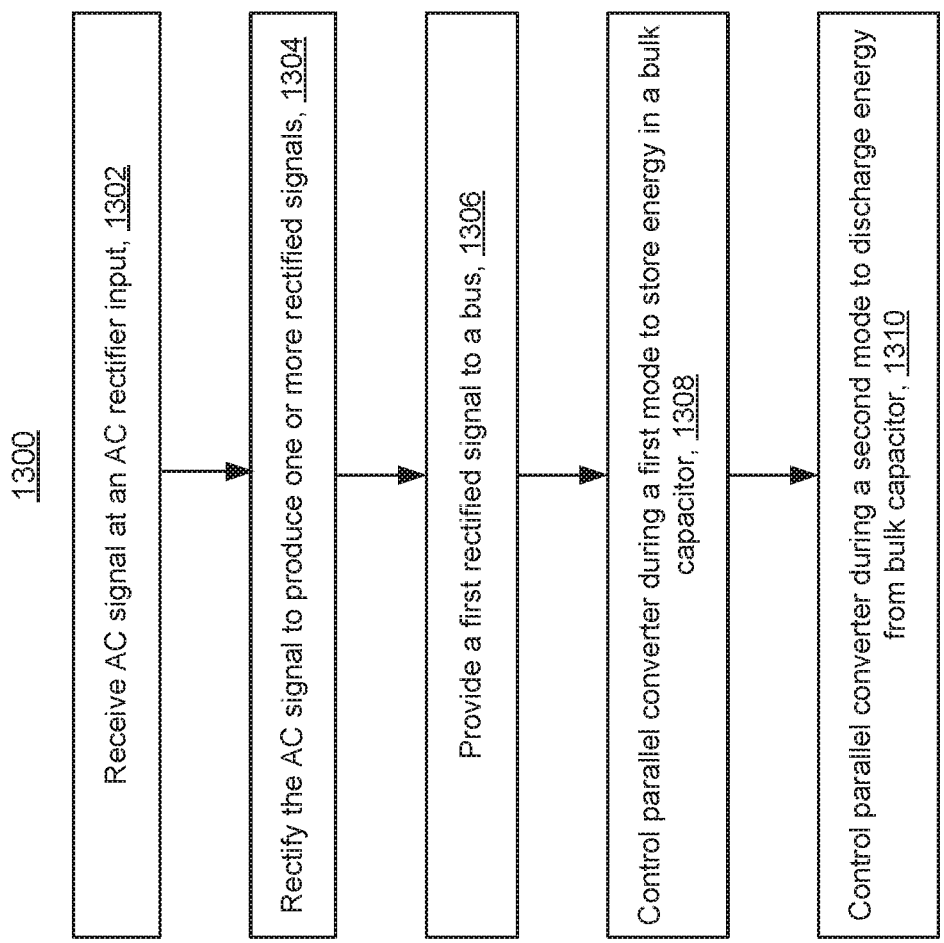
FIG. 13 is a flowchart of one embodiment of a process of operating an AC to DC converter.

FIG. 13 is a flowchart of one embodiment of a process 1300 of operating an AC to DC converter. The process 1300 may be used to operate any of the AC to DC converters in FIGS. 3A, 3B, 4, 6A, 6B, 7, 8, 10A, and/or 10B, but is not limited to those embodiments.

At 1302, an AC signal is received at an input (e.g., Vin+, Vin−) of the AC rectifier 201. The AC rectifier 201 inputs the AC voltage from AC power source 102, in one embodiment.

At 1304 g the AC signal is rectified to produce one or more rectified signals. The rectification may be performed by an embodiment of an AC rectifier 201. The AC rectifier 201 produces a rectified signal between outputs Vout1+ and Vout−, in one embodiment. The AC rectifier 201 produces a rectified signal between outputs Vout2+ and Vout−, in one embodiment. The AC rectifier 201 produces a first rectified signal between outputs Vout1+ and Vout− and a second rectified signal between outputs Vout2+ and Vout−, in one embodiment.

At 1306, a first rectified signal is provided to a bus. In one embodiment, the rectified signal at Vout1+ is provided to the positive line 220*a* of the bus, and the rectified signal at Vout– is provided to the negative line 220*b* of the bus.

At 1308, a parallel converter 202 is controlled during a first mode to store energy in a bulk capacitor. In one embodiment, the parallel converter 202 is controlled during the first mode to use a second rectified signal to store energy into a bulk capacitor 208 coupled to the parallel converter 202. Note that the second rectified signal may be the same as the first rectified signal. For example, in AC to DC converters 200, 240, 300, 600, 650, 700, and 800, the first and second rectified signals are the same signal. However, in the AC to DC converter 1050 in FIG. 10B, the first rectified signal is taken between the cathodes of diodes 204*a*, 204*c* and ground (or across capacitor $C_0$ 206). In the AC to DC converter 1050 in FIG. 10B, the second rectified signal is taken between the cathodes of diodes 1002*a*, 1002*b* and ground (or across capacitor $C_1$ 1006).

In one embodiment of the first mode, the parallel converter 202 is operated to increase the voltage on the bulk capacitor 208 to a greater magnitude than a magnitude of the voltage on the bus. This may include the controller 214 initiating a boost mode responsive to the magnitude of $V_{BUS}$. In one embodiment, the first mode includes a boost mode. In one embodiment, the first mode includes a step up mode.

One embodiment of the first mode includes stopping transferring charge from the bus to the bulk capacitor 208 at or prior to the voltage on the bus dropping to a minimum specified voltage. For example, with reference to FIG. 5A, the controller 214 may input $V_{BUS}$ and compare the magnitude of $V_{BUS}$ to a specified minimum voltage. The controller 214 may be configured to stop the boost mode no later than when the magnitude of $V_{BUS}$ falls to $V_{MIN}$.

At 1310, the parallel converter 202 is controlled in a second mode to discharge energy from a bulk capacitor. In at least an initial portion of the second mode, energy that was stored in the bulk capacitor 208 may be used to increase the voltage on the bus. One embodiment of the second mode includes increasing the voltage on the bus to the same magnitude as the magnitude of the voltage on the bulk capacitor 208. For example, with reference to the timing in FIG. 5A, the controller 214 senses the bus voltage $V_{BUS}$ and determines that the magnitude of $V_{BUS}$ falls to $V_{MIN}$ at time t2. This represents the end of the boost phase. Then, the controller 214 may wait a pre-determined time until t2' to start the buck phase. In this case, the second mode include the controller 214 providing a voltage signal to switch Q2 306 that causes switch Q2 306 to switch on and off between time t2' and t3. With reference to the timing in FIG. 8, the controller 214 may wait a pre-determined time after time t2 until t2' to start the shorting phase. In this case, the second mode may include the controller 214 providing a voltage to switch Q3 502 that turns on switch Q3 502. Note that during the second mode, the energy that was stored in bulk capacitor 208 may also provide energy to the load capacitor 216.

In one embodiment, the second mode includes a buck mode. In one embodiment, the second mode includes a step down mode. In one embodiment, the second mode includes a buck mode followed by a shorting mode.

The process may further comprise operating a voltage converter (e.g., DC to DC converter 212) coupled between the bus and a DC output in order to provide a DC output voltage. The DC output may be comprise the first output $V_{DCOUT+}$ of DC to DC converter 212 connected to output line 225, and second output $V_{DCOUT-}$ connected to second ground 224. Note that operating the voltage converter may include the controller 214 providing a signal to the switch Q4 1008 (see FIG. 11) in the DC to DC converter 212.

The embodiments present above consequently present a topology and operation/control strategy for an AC to DC converter having a parallel converter. The parallel converter allows the size of a bulk capacitor that helps to maintain a rectified voltage on a bus to be greatly reduced. Therefore, the size of the AC to DC converter can be reduced.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   an AC rectifier configured to generate one or more rectified voltages from an alternating current (AC) voltage having a peak voltage each half cycle;

a bus having a positive line and a negative line, wherein the bus is connected to the AC rectifier to receive a first of the one or more rectified voltages that is between the positive line and the negative line;

a parallel converter connected between the positive line and the negative line of the bus, wherein the parallel converter is connected to the AC rectifier in order to receive a second of the one or more rectified voltages;

a bulk capacitor coupled to the parallel converter, wherein the parallel converter further comprises a switch connected to a first terminal of the bulk capacitor, wherein a second terminal of the bulk capacitor is connected to the negative line of the bus; and a controller configured to operate the parallel converter in a first mode approximately twice each cycle of the AC voltage in which energy from the second of the one or more rectified voltages is stored in the bulk capacitor and a second mode approximately twice each cycle of the AC voltage in which the energy stored in the bulk capacitor is discharged to the bus to increase a voltage on the bus during at least an initial portion of the second mode, wherein the controller is further configured to operate the parallel converter in the first mode approximately twice each cycle of the AC voltage to transfer charge from the bus to the bulk capacitor to increase a voltage on the bulk capacitor to a greater magnitude than the peak AC voltage, wherein the controller is configured to control the switch in the second mode to use the energy stored in the bulk capacitor to increase the voltage on the bus and to maintain the voltage on the bus at or above a minimum specified bus voltage, wherein during the initial portion of the second mode the voltage on the bus is increased to a voltage having approximately the same magnitude as the magnitude of the voltage on the bulk capacitor, wherein the voltage on the bus is increased to greater than the peak voltage of the AC voltage approximately each half cycle.

2. The apparatus of claim 1, wherein the controller is further configured to, approximately twice each cycle of the AC voltage, stop charging the bulk capacitor in the first mode and to start discharging the energy stored in the bulk capacitor to the bus in the second mode at or prior to the voltage on the bus dropping to the minimum specified bus voltage.

3. The apparatus of claim 1, wherein the switch is a first switch, and further comprising a second switch connected between the inductor and the negative line of the bus, wherein the parallel converter is configured to operate the second switch in a boost mode during the first mode to store energy in the bulk capacitor using the rectified voltage from the AC rectifier.

4. The apparatus of claim 3, wherein the parallel converter is configured to repeatedly open and close the first switch in a buck mode during an initial portion of the second mode to increase the voltage on the bus using the energy stored in the bulk capacitor.

5. The apparatus of claim 3, wherein the parallel converter is configured to keep the first switch closed in a shorting mode throughout the second mode to increase the voltage on the bus using the energy stored in the bulk capacitor.

6. The apparatus of claim 1, wherein the controller is further configured to:

repeatedly open and close the switch in the parallel converter during a first phase of the second mode to increase the voltage on the bus using the energy stored in the bulk capacitor, wherein the first phase comprises the initial portion of the second mode; and close the switch to connect the bulk capacitor through the inductor to the positive line during a second phase of the second mode to maintain the voltage on the bus at or above the minimum specified bus voltage.

7. The apparatus of claim 1, further comprising a voltage converter coupled between the bus and a DC output of the apparatus, wherein the voltage converter is configured to convert the voltage from the bus and provide the converted voltage to the DC output.

8. A method of operating an alternating current (AC) to direct current (DC) converter, the method comprising:

receiving an AC voltage at an input of an AC rectifier in the AC to DC converter, the AC voltage having a peak voltage each half cycle;

rectifying the AC voltage by the AC rectifier to produce one or more rectified voltages;

providing a first of the one or more rectified voltages to a bus having a positive line and a negative line;

controlling a parallel converter in a first mode approximately twice each cycle of the AC voltage and a second mode approximately twice each cycle of the AC voltage, including:

using a second of the one or more rectified voltages during the first mode to store energy into a bulk capacitor coupled to the parallel converter and to increase a voltage on the bulk capacitor approximately twice each cycle of the AC voltage to a greater magnitude than the peak voltage of the AC voltage, wherein the parallel converter is connected between the positive line and the negative line of the bus, wherein the bulk capacitor has a first terminal connected to the negative line of the bus and a second terminal connected to a switch in the parallel converter; and discharging the energy stored in the bulk capacitor to the bus to increase the voltage on the bus during at least an initial portion of the second mode, including controlling the switch in the second mode to use the energy stored in the bulk capacitor to increase the voltage on the bus and to maintain the voltage on the bus at or above a minimum specified bus voltage, controlling the parallel converter in the second mode further comprising:

operating the parallel converter in a buck mode during a first phase of the second mode to increase the voltage on the bus using energy stored in the bulk capacitor during the first mode; and keeping the switch on during a second phase of the second mode to maintain the voltage on the bus at or above the minimum specified bus voltage without operating the parallel converter in the buck mode.

9. The method of claim 8, wherein controlling the parallel converter in the first mode further comprises stopping transferring charge from the bus to the bulk capacitor at or prior to the voltage on the bus dropping to a minimum specified voltage.

10. An alternating current (AC) to direct current (DC) converter comprising:

a bus having a positive line and a negative line;

an AC rectifier having an input having a first terminal and a second terminal, the AC rectifier having a negative output, a first positive output, and a second positive output, wherein the first positive output is connected to the positive line of the bus, wherein the negative output is connected to the negative line of the bus, wherein the AC rectifier is configured to rectify an AC voltage received at the input and to provide a first rectified voltage between the negative output and the first positive output and a second rectified voltage between the negative output and the second positive output, wherein the AC voltage has a peak voltage each half cycle;

a parallel converter connected to the second positive output of the AC rectifier to receive the second rectified voltage from the AC rectifier, wherein the parallel converter has a first terminal connected to the positive line, a second terminal connected to the negative line, and a third terminal;

an inductor having a first terminal connected to the second positive output of the AC rectifier and a second terminal;

a bulk capacitor coupled between the third terminal of the parallel converter and the negative line, wherein the parallel converter further comprises a first switch connected between a first terminal of the bulk capacitor and the positive line of the bus, wherein a second terminal of the bulk capacitor is connected to the negative line of the bus, wherein the parallel converter further comprises a second switch connected between the second terminal of the inductor and the negative line of the bus;

a controller configured to:
i) operate the parallel converter in a first mode approximately twice each cycle of the AC voltage in which the parallel converter controls the second switch to use the second rectified voltage from the AC rectifier to store energy in the bulk capacitor and to increase the voltage on the bulk capacitor approximately twice each cycle of the AC voltage to a greater magnitude than the peak voltage of the AC voltage; and ii) operate the parallel converter in a second mode approximately twice each cycle of the AC voltage in which the energy stored in the bulk capacitor is discharged to the bus, wherein during at least an initial portion of the second mode the energy stored in the bulk capacitor is used to increase the voltage on the bus, wherein the controller is configured to close the first switch throughout the second mode to use the energy stored in the bulk capacitor to increase the voltage on the bus and to maintain the voltage on the bus at or above a minimum specified bus voltage; and a DC to DC converter coupled in series between the bus and a DC output of the AC to DC converter, wherein the DC to DC converter is configured to convert the voltage on the bus to a DC output voltage at the DC output.

11. The alternating current (AC) to direct current (DC) converter of claim 10, wherein the parallel converter further comprises:
a thermistor connected in series with the first switch between the first terminal of the bulk capacitor and the positive line of the bus.

12. The alternating current (AC) to direct current (DC) converter of claim 10, wherein:
the inductor is a first inductor; and
the parallel converter further comprises a second inductor connected in series with the first switch between the first terminal of the bulk capacitor and the positive line of the bus.

* * * * *

UNITED STATES PATENT AND TRADEMARK OFFICE
CERTIFICATE OF CORRECTION

PATENT NO. : 11,482,944 B2
APPLICATION NO. : 16/007731
DATED : October 25, 2022
INVENTOR(S) : Dai Page 1 of 1

It is certified that error appears in the above-identified patent and that said Letters Patent is hereby corrected as shown below:

In the Claims

Column 18, Lines 65-66 (Claim 1, Lines 2-3): After "generate" and before "from", remove "one or more rectified voltages" and insert -- a rectified voltage --

Column 19, Lines 2-3 (Claim 1, Lines 6-7): After "receive" and before "between", remove "a first of the one or more rectified voltages that is" and insert -- the rectified voltage --

Column 19, Lines 6-8 (Claim 1, Lines 10-12): After "the" remove "bus, wherein the parallel converter is connected to the AC rectifier in order to receive a second of the one or more rectified voltages;" and insert -- bus; an inductor connected to the positive line of the bus; --

Column 19, Line 11 (Claim 1, Line 15): After "connected" and before "a", remove "to" and insert -- between the inducted and --

Column 19, Lines 16-17 (Claim 1, Lines 20-21): After "the" and before "is", remove "second of the one or more rectified voltages" and insert -- rectified voltage --

Signed and Sealed this
Sixth Day of December, 2022

Katherine Kelly Vidal
*Director of the United States Patent and Trademark Office*